United States Patent
Chen et al.

(10) Patent No.: US 12,041,628 B2
(45) Date of Patent: Jul. 16, 2024

(54) DATA TRANSMISSION METHOD, APPARATUS, DEVICE, AND STORAGE MEDIUM

(71) Applicant: GUANGDONG OPPO MOBILE TELECOMMUNICATIONS CORP., LTD., Guangdong (CN)

(72) Inventors: Wenhong Chen, Dongguan (CN); Yun Fang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 362 days.

(21) Appl. No.: 17/479,778

(22) Filed: Sep. 20, 2021

(65) Prior Publication Data

US 2022/0022238 A1 Jan. 20, 2022

Related U.S. Application Data

(63) Continuation of application No. PCT/CN2019/080235, filed on Mar. 28, 2019.

(51) Int. Cl.
*H04W 72/23* (2023.01)
*H04L 1/00* (2006.01)
(Continued)

(52) U.S. Cl.
CPC .......... *H04W 72/23* (2023.01); *H04L 1/0003* (2013.01); *H04L 1/0061* (2013.01); *H04L 5/0051* (2013.01); *H04W 72/0466* (2013.01)

(58) Field of Classification Search
CPC .............. H04W 72/23; H04W 72/0466; H04L 1/0003; H04L 1/0061; H04L 5/0051
(Continued)

(56) References Cited

U.S. PATENT DOCUMENTS 11,050,525 B2 * 6/2021 Vilaipornsawai ......... H04L 1/08
11,452,130 B2 * 9/2022 Lee ........................ H04W 72/21
(Continued)

FOREIGN PATENT DOCUMENTS

| CN | 103313273 A | 9/2013 |
|---|---|---|
| CN | 104349491 A | 2/2015 |

(Continued)

OTHER PUBLICATIONS

The first Office Action and search report of corresponding Chinese application No. 202111321055.9, dated Jan. 13, 2023, with machine translation by Google Translate.

(Continued)

*Primary Examiner* — Mong-Thuy T Tran
(74) *Attorney, Agent, or Firm* — Ladas & Parry, LLP

(57) ABSTRACT

A data transmission method, an apparatus, a device, and a storage medium is provided. A network device (110) determines first information according to whether currently transmitted PDSCH is repeatedly transmitted by using a plurality of TRPs, and indicates the first information to a terminal device (120). The terminal device (120) determines whether different DMRS port groups of the PDSCH correspond to same data, or determines a TCI state corresponding to each DMRS port of the PDSCH according to the first information indicated by the network device (110), and then detects data according to whether data corresponding to the ports are the same or the TCI state, ensuring that data can be received correctly.

14 Claims, 7 Drawing Sheets

(51) Int. Cl.
*H04L 5/00* (2006.01)
*H04W 72/044* (2023.01)

(58) Field of Classification Search
USPC .......................................................... 370/329
See application file for complete search history.

(56) References Cited

U.S. PATENT DOCUMENTS

| | | | |
|---|---|---|---|
| 11,723,027 B2* | 8/2023 | Lee ........................ | H04L 5/0051 370/329 |
| 2015/0263829 A1* | 9/2015 | Nguyen ................ | H04W 72/23 370/280 |
| 2015/0327226 A1* | 11/2015 | Cheng ................... | H04L 5/0044 370/329 |
| 2015/0334683 A1 | 11/2015 | Corp | |
| 2016/0227521 A1* | 8/2016 | Han ................... | H04W 72/0453 |
| 2018/0343653 A1 | 11/2018 | Guo | |
| 2019/0349964 A1* | 11/2019 | Liou ..................... | H04W 76/27 |
| 2020/0015200 A1* | 1/2020 | Vilaipornsawai ..... | H04W 72/23 |
| 2021/0144700 A1* | 5/2021 | Lee ........................ | H04L 5/0094 |
| 2023/0045767 A1* | 2/2023 | Lee ........................ | H04L 5/0044 |

FOREIGN PATENT DOCUMENTS

| | | |
|---|---|---|
| CN | 107534976 A | 1/2018 |
| CN | 109152050 A | 1/2019 |
| CN | 109511172 A | 3/2019 |
| EP | 3925342 A1 | 12/2021 |
| WO | 2014110822 A1 | 7/2014 |
| WO | 2020/164014 A1 | 8/2020 |
| WO | 2020191761 A1 | 10/2020 |

OTHER PUBLICATIONS

ZTE, Sanechips, "Details and evaluation results on beam indication", R1-1717429, 3GPP TSG RAN WG1 Meeting #90-bis, Prague, Czechia, Oct. 9-13, 2017, entire document.

Ericsson, "Correction to 38.213 on beam failure detection in C-DRX", R1-1813249, 3GPP TSG RAN WG1 Meeting #95, Spokane, United States, Nov. 12-16, 2018, entire document.

Huawei, HISilicon, "Enhancements on multi-TRP/panel transmission", R1-1812243, 3GPP TSG RAN WG1 Meeting #95,Spokane, USA, Nov. 12-16, 2018, entire document.

The first Office Action of corresponding European application No. 19921145.9, dated Nov. 23, 2022.

Huawei, HiSilicon. 3GPP TSG RAN WG1 Meeting #96; R1-1901567, Enhancements on Multi-TRP/panel transmission. Athens, Greece, Feb. 25-Mar. 1, 2019, entire document.

OPPO. 3GPP TSG RAN WG1 Meeting #96; R1-1902701, Enhancements on multi-TRP and multi-panel transmission, Athens, Greece, Feb. 25-Mar. 1, 2019, entire document.

The EESR of corresponding European application No. 19921145.9, dated Feb. 8, 2022.

ZTE:"Enhancements on multi-TRP/Panel transmission", 3GPP Draft; R1-1900087 Enhancements On Multi-TRP and Multi-Panel Transmission, 3rd Generation Partnership Project (3GPP), Mobile Competence Centre; 650, Route Des Lucioles; F-06921 Sophia-Antipolis, vol. RAN WG1, No. Taipei; Jan. 21, 2019-Jan. 25, 2019 Jan. 20, 2019(Jan. 20, 2019), XP051593013, entire document.

LG ELECTRONICS:"Enhancements on multi-TRP/Panel transmission", 3GPP Draft; R1-1902091, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019 Feb. 16, 2019(Feb. 16, 2019), XP051599786, entire document.

OPPO:"Enhancements on multi-TRP and multi-panel transmission", 3GPP Draft; R1-1900266, 3rd Generation Partnership Project (3GPP), Mobile Competence Centre; 650, Route Des Lucioles; F-06921 Sophia-Antipolis Cedex; France, vol. RAN WG1, No. Taipei; Jan. 21, 2019-Jan. 25, 2019 Jan. 20, 2019 (Jan. 20, 2019), XP051593180, entire document.

Huawei et al.:"Summary of AI:7.2.8.2 Enhancements on Multi-TRP/Panel Transmission of Offline Discussion", 3GPP Draft; R1-1903541 Feature Lead SummaryFor Enhancements On MULTI-TRP_V2,3rd Generation Partnership Project (3GPP), Mobile Competence Centre, 650, Route Des Lucioles; F-06921 Sophia-Antipolis CE, vol. RAN WG1, No. Athens, Greece; Feb. 25, 2019-Mar. 1, 2019 Feb. 27, 2019(Feb. 27, 2019), XP051601181, entire document.

International Search Report (ISR) dated Dec. 30, 2019 for Application No. PCT/CN2019/080235.

Written Opinion of the International Searching Authority for International Application No. PCT/CN2019/080235, with English translation provided by Google Translate.

* cited by examiner

DATA TRANSMISSION METHOD, APPARATUS, DEVICE, AND STORAGE MEDIUM

CROSS-REFERENCE TO RELATED APPLICATIONS

This application is a continuation of International Application No. PCT/CN2019/080235, filed on Mar. 28, 2019, the disclosure of which is hereby incorporated by reference in its entirety.

TECHNICAL FIELD

Embodiments of the present application relate to communication technology, in particular to a data transmission method, an apparatus, a device, and a storage medium.

BACKGROUND

In a New Radio (NR) system, downlink and uplink incoherent transmission based on a plurality of transmission/reception points (TRP) is introduced. Where a backhaul connection between TRPs may be ideal or non-ideal. In an ideal backhaul, an information interaction between TRPs can be fast and dynamic, while in a non-ideal backhaul, an information interaction between TRPs can only be quasi-static since the time delay is relative high. In the downlink incoherent transmission, a plurality of TRPs may independently schedule data channel transmission of a terminal device by using different control channels, and scheduled data channels may be transmitted in a same time slot or different time slots. A terminal device needs to support receiving physical downlink control channel (PDCCH) and physical downlink shared channel (PDSCH) from different TRPs simultaneously. Where PDSCH channels sent by different TRPs may carry same data, so transmission reliability of the PDSCH channels can be further improved by diversity transmission of the plurality of TRPs. For enhanced mobile broadband (eMBB) data, PDSCH channels sent by different TRPs usually carry different data to improve spectrum efficiency; and for ultra-reliable low-latency communication (URLLC) data, PDSCH channels sent by different TRPs usually carry same data to improve transmission reliability.

In the prior art, a network device may schedule downlink PDSCH transmission of a plurality of TRPs through Downlink Control Information (DCI). The network device may configure a plurality of TCI states in DCI through transmission configuration indicator (TCI) information for downlink PDSCH transmission, where different TCI states correspond to different TRP transmission. If it is eMBB data that is scheduled, different transport layers may carry different data in order to meet requirements of throughput; and if it is URLLC data that is scheduled, different transport layers may carry same data in order to meet requirements of reliability. For single layer transmission, if it is eMBB data, usually only one TCI state needs to be applied; and if it is URLLC, diversity transmission of a plurality of TCI states should be considered at the same time.

However, in the above solution, since the terminal device cannot know whether eMBB data or URLLC data is currently transmitted, the terminal device cannot determine whether some or all of TCI states configured by the network device are used for PDSCH transmission or whether same data or different data is transmitted on different transport layers, resulting in data transmission errors and other problems.

SUMMARY

Embodiments of the present application provide a data transmission method, an apparatus, a device, and a storage medium, for solving problems that in a current technical solution, a terminal device cannot know whether eMBB data or URLLC data is currently transmitted, and cannot determine whether some or all of TCI states configured by a network device are used for PDSCH transmission, or whether same data or different data is transmitted on different transport layers, resulting in data transmission errors.

In a first aspect, an embodiment of the present application may provide a data transmission method applied to a network device, the method including:
  determining first information according to whether currently transmitted PDSCH is repeatedly transmitted by using a plurality of TRPs, where the first information is used for a terminal device to determine whether different DMRS port groups of the PDSCH correspond to same data, or to determine a TCI state corresponding to each DMRS port of the PDSCH; and
  sending the first information to the terminal device.

In a second aspect, an embodiment of the present application provides a data transmission method applied to a terminal device, the method including:
  obtaining first information indicated by a network device;
  determining whether different DMRS port groups of a PDSCH correspond to same data according to the first information; and
  detecting the PDSCH according to whether the different DMRS port groups correspond to the same data.

In a specific implementation, the first information includes any one of following information:
  a scrambling mode of CRC check codes scheduling DCI of the PDSCH;
  a high layer parameter for indicating whether to perform simultaneous repetition transmission of the PDSCH;
  DMRS port indication information; and
  NDI information of a closed transport block.

In a third aspect, an embodiment of the present application provides a data transmission method applied to a terminal device, the method including:
  obtaining first information indicated by a network device;
  determining a TCI state corresponding to each DMRS port of a PDSCH according to the first information; and
  detecting the PDSCH according to the TCI state corresponding to each DMRS port of the PDSCH.

In a specific implementation, the first information includes any one of following information:
  a scrambling mode scheduling CRC check codes of DCI of the PDSCH;
  a high layer parameter for indicating whether to perform simultaneous repetition transmission of the PDSCH;
  DMRS port indication information; and
  NDI information of a closed transport block.

In a fourth aspect, an embodiment of the present application provides a data transmission apparatus, including:
  a processing module, configured to determine first information according to whether currently transmitted PDSCH is repeatedly transmitted by using a plurality of TRPs, where the first information is used for a terminal device to determine whether different DMRS port groups of the PDSCH correspond to same data, or to determine a TCI state corresponding to each DMRS port of the PDSCH; and a sending module, configured to send the first information to the terminal device.

In a fifth aspect, an embodiment of the present application provides a data transmission apparatus, including:

an obtaining module, configured to obtain first information indicated by a network device;

a processing module, configured to determine whether different DMRS port groups of a PDSCH correspond to same data according to the first information; and a receiving module, configured to detect the PDSCH according to whether the different DMRS port groups correspond to the same data.

In a sixth aspect, an embodiment of the present application provides a data transmission apparatus, including:

an obtaining module, configured to obtain first information indicated by a network device;

a processing module, configured to determine a TCI state corresponding to each DMRS port of a PDSCH according to the first information; and a receiving module, configured to detect the PDSCH according to the TCI state corresponding to each DMRS port of the PDSCH.

In a seventh aspect, an embodiment of the present application may provide a network device, including:

a processor, a memory, a transmitter, and an interface for communicating with a terminal device;

the memory stores a computer executable instruction; and the processor executes the computer executable instruction stored in the memory to enable the processor to execute the data transmission method provided by any implementation of the first aspect.

In an implementation, the above processor may be a chip.

In an eighth aspect, an embodiment of the present application may provide a terminal device, including:

a processor, a memory, a receiver, and an interface for communicating with a sending end device;

the memory stores a computer executable instruction; and the processor executes the computer executable instruction stored in the memory to enable the processor to execute the data transmission method provided by any implementation of the second aspect.

In a ninth aspect, an embodiment of the present application may provide a terminal device, including:

a processor, a memory, a receiver, and an interface for communicating with a sending end device;

the memory stores a computer executable instruction; and the processor executes the computer executable instruction stored in the memory to enable the processor to execute the data transmission method provided by any implementation of the third aspect.

In an implementation, in a specific implementation of the above terminal device, the processor may be a chip.

In a tenth aspect, an embodiment of the present application may provide a computer readable storage medium, the computer readable storage medium storing an computer executable instruction, and when being executed by a processor, the computer executable instruction is used to implement the data transmission method provided by any implementation of the first aspect.

In an eleventh aspect, an embodiment of the present application may provide a computer readable storage medium, the computer readable storage medium storing an computer executable instruction, and when being executed by a processor, the computer executable instruction is used to implement the data transmission method provided by any implementation of the second aspect.

In a twelfth aspect, an embodiment of the present application may provide a computer readable storage medium, the computer readable storage medium storing an computer executable instruction, and when being executed by a processor, the computer executable instruction is used to implement the data transmission method provided by any implementation of the third aspect.

In a thirteenth aspect, an embodiment of the present application provides a program, and when being executed by a processor, the program is used to execute the data transmission method provided by any implementation of the first aspect.

In a fourteenth aspect, an embodiment of the present application provides a program, and when being executed by a processor, the program is used to execute the data transmission method provided by any implementation of the second aspect.

In a fifteenth aspect, an embodiment of the present application provides a program, and when being executed by a processor, the program is used to execute the data transmission method provided by any implementation of the third aspect.

In a sixteenth aspect, an embodiment of the present application provides a computer program product, including a program instruction, and the program instruction is used to implement the data transmission method provided by any implementation of the first aspect.

In a seventeenth aspect, an embodiment of the present application provides a computer program product, including a program instruction, and the program instruction is used to implement the data transmission method provided by any implementation of the second aspect.

In a eighteenth aspect, an embodiment of the present application provides a computer program product, including a program instruction, and the program instruction is used to implement the data transmission method provided by any implementation of the third aspect.

In a nineteenth aspect, an embodiment of the present application provides a chip, including a processing module and a communication interface, and the processing module may execute the data transmission method provided by any implementation of the first aspect.

Further, the chip further includes a storing module (e.g., a memory), the storing module storing an instruction, and the processing module being used to execute the instruction stored in the storing module, and execution of the instruction stored in the storing module enables the processing module to execute the data transmission method provided by any implementation of the first aspect.

In a twentieth aspect, an embodiment of the present application provides a chip, including a processing module and a communication interface, and the processing module may execute the data transmission method provided by any implementation of the second aspect or the third aspect.

Further, the chip further includes a storing module (e.g., a memory), the storing module storing an instruction, and the processing module being used to execute the instruction stored in the storing module, and execution of the instruction stored in the storing module enables the processing module to execute the data transmission method provided by any implementation of the second aspect or the third aspect.

In a data transmission method, an apparatus, a device, and a storage medium provided by the embodiments of the present application, a network device determines first information according to whether currently transmitted PDSCH is repeatedly transmitted by using a plurality of TRPs, and indicates the first information to a terminal device. The terminal device determines whether different DMRS port groups of the PDSCH correspond to same data, or determines a TCI state corresponding to each DMRS port of the PDSCH according to the first information indicated by the network device, and then detects data according to whether data corresponding to the ports are the same or the TCI state, ensuring that data can be received correctly.

BRIEF DESCRIPTION OF DRAWINGS

In order to explain embodiments of the present application or a technical solution in the prior art more clearly, drawings required in the embodiments or a description of the prior art will be briefly introduced below. Obviously, drawings in a following description are some embodiments of the present application, and other drawings may be obtained by persons of ordinary skills in the art according to these drawings without paying creative labor.

DESCRIPTION OF EMBODIMENTS

In order to make a purpose, a technical solution, and an advantage of embodiments of the present application clearer, the technical solution of the embodiments of the present application will be described clearly and completely in conjunction with drawings in the embodiments of the present application. Obviously, described embodiments are part of the embodiments of the present application, not all of the embodiments. Based on the embodiments in the present application, all other embodiments obtained by persons of ordinary skills in the art without creative labor belong to protection scope of the present application.

Terms "first", "second", etc. in a specification, a claim, and drawings described above of the embodiments in the present application are used to distinguish similar objects, and are not necessary to be used to describe a specific order or sequence. It should be understood that the used data may be interchanged under an appropriate circumstance, so that the embodiments of the present application described herein, for example, can be implemented in an order other than those illustrated or described herein. In addition, terms "including" and "having" and any variations thereof are intended to cover non-exclusive inclusion. For example, a process, a method, a system, a product, or a device including a series of steps or units are not necessary to be limited to those steps or units clearly listed, but may include other steps or units not clearly listed or inherent to the process, the method, the product, or the device.

It should be understood that terms "system" and "network" are often used interchangeably herein. Terms "and/or" are only an association relationship describing associated objects herein, which means that there can be three kinds of relationships, for example, A and/or B, which can mean that A exists alone, A and B exist at the same time, and B exists alone. In addition, characters "/" herein generally indicates that context objects are in a relationship of "or".

In the below, the technical solution of the embodiments of the present application will be described in conjunction with drawings in the embodiments of the present application. Obviously, described embodiments are part of the embodiments of the present application, not all of the embodiments. Based on the embodiments in the present application, all other embodiments obtained by persons of ordinary skills in the art without creative labor belong to protection scope of the present application.

Figure 1:
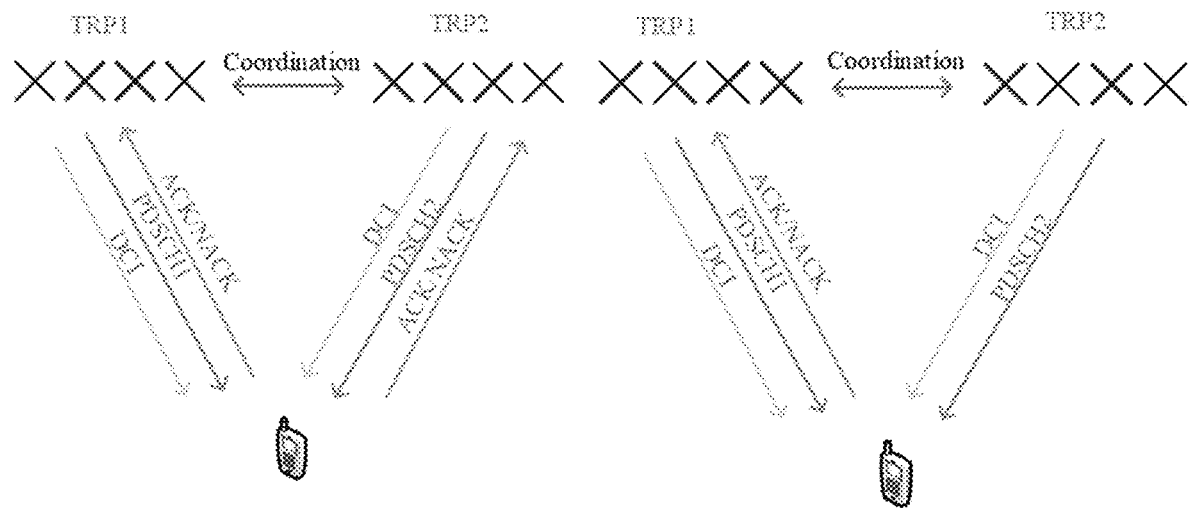
FIG. 1 is a schematic diagram of downlink incoherent transmission.

FIG. 1 is a schematic diagram of downlink incoherent transmission. As shown in FIG. 1, in downlink incoherent transmission, a plurality of transmission/reception points (TRP) may independently schedule data channel transmission of a terminal device (also called a terminal) by using different control channels, and scheduled data channels may be transmitted in a same time slot or different time slots. A terminal device needs to support receiving physical downlink control channel (PDCCH) and physical downlink shared channel (PDSCH) from different TRPs simultaneously. When the terminal device feeds back acknowledgment (ACK)/negative acknowledgment (NACK), the ACK/NACK may be respectively fed back to different TRPs transmitting corresponding PDSCH channels (as shown in a left side of FIG. 1), or may be combined and reported to one TRP (as shown in a right side of FIG. 1). The former may be applied to two scenes of ideal backhaul and non-ideal backhaul, while the latter can only be applied to scene of ideal backhaul. Where PDSCH channels sent by different TRPs may carry same data, so transmission reliability of the PDSCH channels can be further improved by diversity transmission of a plurality of TRPs. At this time, the terminal device only needs to report one ACK/NACK for a plurality of PDSCH channels carrying same data. For enhanced mobile broadband (eMBB) data, PDSCH channels sent by different TRPs usually carry different data (using different demodulation reference signal (DMRS) ports) to improve frequency spectrum efficiency; and for ultra-reliable low-latency communication (URLLC) data, PDSCH channels sent by different TRPs usually carry same data (using a same DMRS port) to improve transmission reliability.

Figure 2:
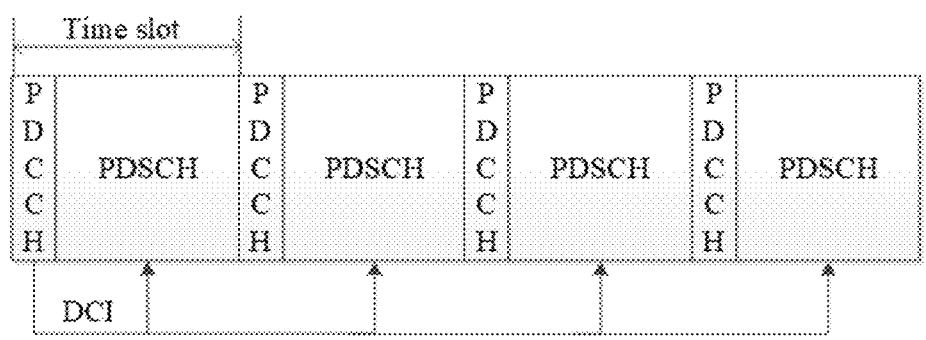
FIG. 2 is a schematic diagram of PDSCH repetition transmission based on time slot.
Figure 3:
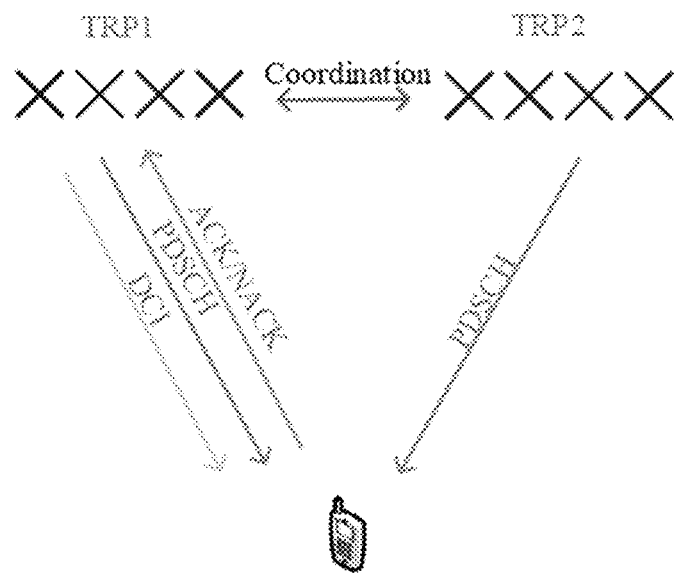
FIG. 3 is a schematic diagram of PDSCH repetition transmission based on TRP.

FIG. 2 is a schematic diagram of PDSCH repetition transmission based on time slot, and FIG. 3 is a schematic diagram of PDSCH repetition transmission based on TRP. As shown in FIGS. 2 and 3, in order to improve transmission reliability of a PDSCH, PDSCH repetition transmission is introduced into New Radio (NR), i.e., a PDSCH carrying same data is transmitted for a plurality of times through different time slots/TRP/redundant versions, etc., thereby obtaining diversity gain and reducing a block error ratio (BLER). Specifically, the repetition transmission may be performed in a plurality of time slots (as shown in FIG. 2) or on a plurality of TRPs (as shown in FIG. 3). For repetition in the plurality of time slots, one piece of downlink control information (DCI) may schedule a plurality of PDSCHs carrying the same data to be transmitted in a continuous plurality of time slots, using same frequency domain resources. For repetition of the plurality of TRPs, the PDSCH carrying the same data is transmitted on different TRPs respectively, and different beams may be used (at this time, a plurality of transmission configuration indicator (TCI) states need to be indicated in DCI, and each TCI state is used for one repetition transmission). The repetition of the plurality of TRPs may also be combined with a multi-slot mode, using continuous time slots for transmission, and using different TRPs in different time slots for transmission.

However, in the above solution, a network device may schedule downlink PDSCH transmission of a plurality of TRPs through one piece of DCI. The network device may configure a plurality of TCI states in DCI through TCI information for downlink PDSCH transmission, where different TCI states correspond to different TRP transmission. If it is eMBB data that is scheduled, different transport layers may carry different data in order to meet requirements of throughput; and if it is URLLC data that is scheduled, different transport layers may carry same data in order to meet requirements of reliability. For single layer transmission, if it is eMBB data, usually only one TCI state needs to be applied; and if it is URLLC, diversity transmission of a plurality of TCI states should be considered at the same time. Since the terminal device cannot know whether eMBB data or URLLC data is currently transmitted, the terminal device cannot determine whether some or all of TCI states configured by the network device are used for PDSCH transmission or whether same data or different data is transmitted on different transport layers.

For the above problems, an embodiment of the present application provides a data transmission method: a terminal device determines TCI states corresponding to each DMRS port of a PDSCH or whether different DMRS port group corresponds to same data according to indication information of a network device, thereby receiving a corresponding PDSCH. Based on the technical solution of the present application, a network device informs a terminal device whether URLLC data (repetition) or eMBB data (multiplexing) is carried in a current PDSCH through explicit or implicit indication information, and the terminal device may determine whether PDSCH transmission is diversity transmission according to the indication information, such as using some of TCI states or all of TCI states, and whether same or different data is carried by different DMRS port groups, thereby meeting different requirements of URLLC and eMBB respectively.

The technical solution of the embodiments in the present application may be applied to various communication systems, for example a global system of mobile communication (GSM) system, a code division multiple access (CDMA) system, a wideband code division multiple access (WCDMA) system, a general packet radio service (GPRS), a long term evolution, LTE) system, a LTE frequency division duplex (FDD) system, a LTE time division duplex (TDD) system, an advanced long term evolution (LTE-A) system, a new radio (NR) system, an evolution system of NR system, a LTE-based access to unlicensed spectrum (LTE-U) system, a NR-based access to unlicensed spectrum (NR-U) system, a universal mobile telecommunication system (UMTS), a worldwide interoperability for microwave access (WiMAX) communication system, a wireless local area network (WLAN) system, a wireless fidelity (WiFi) system, a next generation communication system, or other communication systems, etc.

Generally speaking, a traditional communication system supports a limited number of connections and is easy to be implemented. However, with the development of communication technology, a mobile communication system will not only support a traditional communication, but also support, for example, a device to device (D2D) communication, a machine to machine (M2M) communication, a machine type communication (MTC), a vehicle to vehicle (V2V) communication, etc., and the embodiments of the present application may also be applied to these communication systems.

Figure 4:
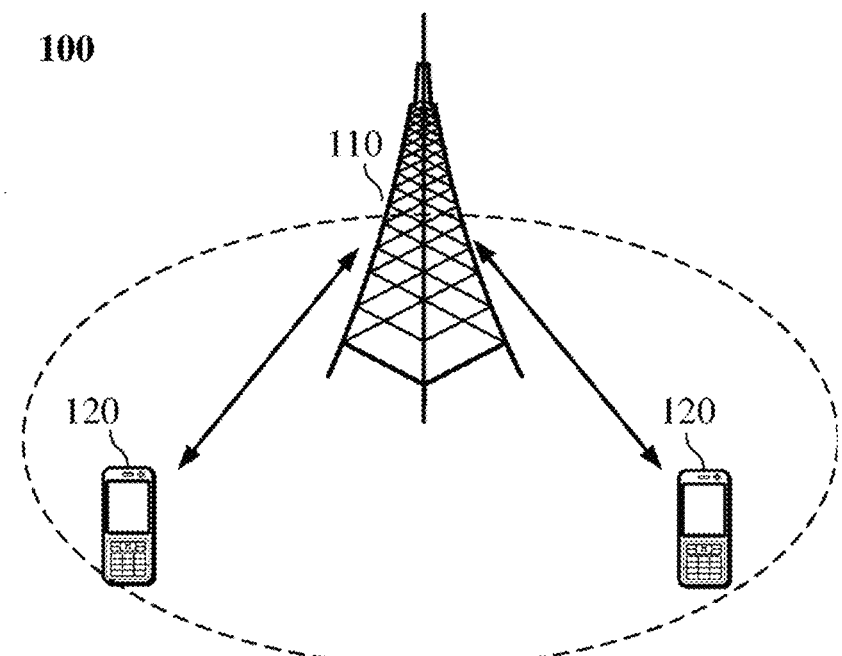
FIG. 4 is a schematic diagram of a communication system applied in an embodiment of the present application.

FIG. 4 is a schematic diagram of a communication system applied in an embodiment of the present application. As shown in FIG. 4, the communication system 100 may include a network device 110, and the network device 110 may be a device which communicates with a terminal device 120 (or a communication terminal or a terminal). The network device 110 may provide communication coverage for a specific geographical area, and may communicate with a terminal device located in the coverage area. In an implementation, the network device 110 may be a base transceiver station (BTS) in a GSM system or a CDMA system, a NodeB (NB) in a WCDMA system, an evolutional NodeB (eNB or NodeB) in an LTE system, or a wireless controller in a cloud radio access network (CRAN), or the network device may be a mobile switching center, a relay station, an access point, an on-board device, a wearable device, a hub, a switch, a bridge, a router, a network device in a 5G network or a network device in a future evolved public land mobile network (PLMN), etc.

The communication system 100 further includes at least one terminal device 120 located within the coverage area of the network device 110. As used herein, "terminal device" includes but is not limited to a connection via a wired lines, such as a connection via a public switched telephone network (PSTN), a digital subscriber line (DSL), a digital cable, and a direct cable; and/or another data connection/network; and/or via a wireless interface, such as a cellular network, a wireless local area network (WLAN), a digital television network such as a DVB-H network, a satellite network, an AM-FM broadcast transmitter; and/or an apparatus of another terminal device configured to receive/send a communication signal; and/or an Internet of Things (IoT) device. A terminal device configured to communicate through a wireless interface may be called a "wireless communication terminal", a "wireless terminal" or a "mobile terminal". Examples of the mobile terminal include, but are not limited to, a satellite or a cellular phone; a personal communications system (PCS) terminal which may combine cellular radio telephone with abilities of data processing, fax, and data communication; a PDA that may include a radiotelephone, a pager, Internet/intranet access, a web browsers, a notebook, a calendar, and/or a global positioning system (GPS) receiver; and a conventional laptop and/or a palmtop receiver or other electronic apparatuses including a radio telephone transceiver. The terminal device may refer to an access terminal, user equipment (UE), a subscriber unit, a subscriber station, a mobile station, a mobile platform, a remote station, a remote terminal, a mobile device, a user terminal, a terminal, a wireless communication device, a user agent or a user apparatus. An access terminal may be a cellular phone, a cordless phone, a session initiation protocol (SIP) phone, a wireless local loop (WLL) station, a personal digital assistant (PDA), a handheld device with wireless communication function, a computing device or other processing devices connected to wireless modem, an on-board device, a wearable device, a terminal device in 5G network or a terminal device in a future evolved PLMN, etc.

In an implementation, a device to device (D2D) communication may be performed between the terminal devices 120, i.e., the technical solution provided in the present application may also be applied to a communication between two terminal devices.

In an implementation, the 5G system or the 5G network may also be called a new radio (NR) system or NR network.

FIG. 4 shows one network device and two terminal devices by way of example. In an implementation, the communication system 100 may include a plurality of network devices and other number of terminal devices may be included in a coverage area of each network device, which is not limited by the embodiments of the present application.

In FIG. 4, the network device may be an access device, for example an access device in NR-U system, for example a 5G new radio access technology (NR) next generation Node B (gNB), a small station, a micro station, a relay station, a transmission and reception point (TRP), a roadside unit (RSU), etc.

The terminal device may also be called a mobile terminal, user equipment (for short: UE), an access terminal, a subscriber unit, a subscriber station, a mobile station, a mobile platform, a user terminal, a terminal, a wireless communication device, a user agent or a user apparatus. Specifically, it may be a smart phone, a cellular phone, a cordless phone, a personal digital assistant (for short: PDA) device, a handheld device with a wireless communication function or other processing devices connected to a wireless modem, an on-board device, a wearable device, etc. In the embodiment of the present application, the terminal device has an interface for communicating with the network device (e.g., a cellular network).

In an implementation, the communication system 100 may further include other network entities such as a network controller, a mobile management entity, etc., which is not limited by the embodiment of the present application.

The following is a detailed description of a data transmission method provided by the present application through several specific embodiments.

Figure 5:
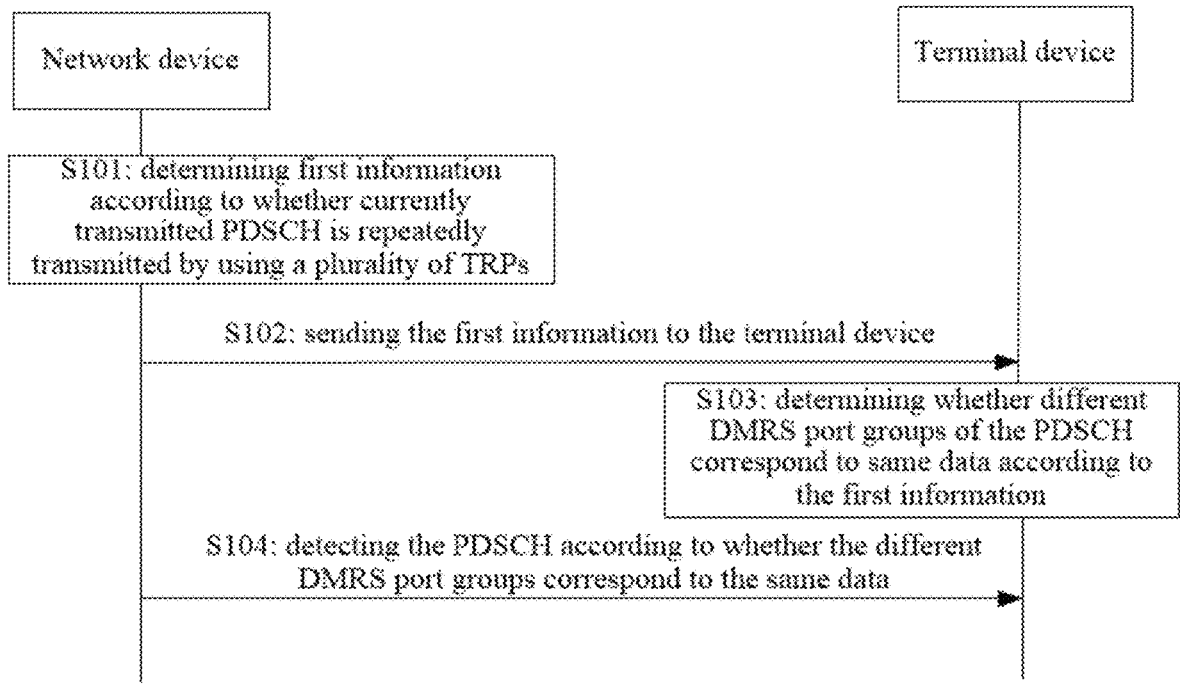
FIG. 5 is a flow diagram of a first embodiment of a data transmission method provided by an embodiment of the present application.

FIG. 5 is a flow diagram of a first embodiment of a data transmission method provided by an embodiment of the present application. As shown in FIG. 5, the data transmission method may be applied between a network device and a terminal device, and specifically includes following steps:

S101: determining first information according to whether currently transmitted PDSCH is repeatedly transmitted by using a plurality of TRPs.

In this step, downlink data transmission from the network device to the terminal device may be carried by using a PDSCH. During transmission, it is necessary to determine whether currently transmitted PDSCH is repeatedly transmitted by using a plurality of TRPs, which may be determined by a service type of data specifically. Generally speaking, the service type of the data at least includes eMBB or URLLC. Generally speaking, if the service type of the data is URLLC, the plurality of TRPs for the repetition transmission are used, otherwise the plurality of TRPs for the repetition transmission are not used. The network device may determine the first information according to whether the plurality of TRPs for the repetition transmission are used after determining whether the plurality of TRPs for the repetition transmission are used.

The first information is information used by a receiving end (i.e., the terminal device) to determine whether different DMRS port groups of the PDSCH correspond to same data.

Specifically, if the plurality of TRPs for the repetition transmission are used, the network device uses different TRPs to send a PDSCH carrying same data, where the PDSCH sent by the different TRPs uses a same DMRS port or different DMRS ports. If the plurality of TRPs for the repetition transmission are not used, the network device uses a single TRP to transmit a PDSCH or the plurality of TRPs to transmit a PDSCH carrying different data.

S102: sending the first information to the terminal device.

In this step, the network device may indicate the first information to the terminal device through a high layer signaling or DCI.

In a specific implementation of this solution, the first information may be any one of following information:
   a scrambling mode of CRC check codes of DCI scheduling the PDSCH;
   a high layer parameter for indicating whether to perform simultaneous repetition transmission of the PDSCH;
   DMRS port indication information; and
   new data indicator (NDI) information of a closed transport block.

For the terminal device, the first information is obtained, so that it may be determined whether the different DMRS port groups correspond to the same data according to the first information. Specifically, the first information is obtained through a high layer signaling or DCI sent by the network device.

S103: according to the first information, determining whether the different DMRS port groups of the PDSCH correspond to the same data.

In this step, after receiving the first information, the terminal device determines whether the different DMRS port groups of the PDSCH correspond to the same data according to indication of the first information. Since the first information includes various possible information, when the first information is different, it is determined whether the DMRS port groups correspond to the same data in different ways, including at least following implementations:

in a first implementation, when the first information includes the scrambling mode of the cyclic redundancy check (CRC) check codes of the DCI scheduling the PDSCH, if the CRC check codes of the DCI of the PDSCH is scrambled by using a modulation and coding scheme (MCS)-cell radio network temporary identify (C-RNTI), it is determined that the different DMRS port groups of the PDSCH correspond to the same data; and if the CRC check codes of the DCI scheduling the PDSCH is scrambled by using a cell radio network temporary identify (C-RNTI), it is determined that the different DMRS port groups of the PDSCH correspond to different data;

in a second implementation, when the first information includes the high layer parameter for indicating whether to perform the simultaneous repetition transmission of the PDSCH, if the high layer parameter indicates to perform the simultaneous repetition transmission of the PDSCH, it is determined that the different DMRS port groups of the PDSCH correspond to the same data; and if the high layer parameter indicates to not perform the simultaneous repetition transmission of the PDSCH, it is determined that the different DMRS port groups of the PDSCH correspond to different data;

in a third implementation, when the first information includes the DMRS port indication information, the terminal device determines DMRS ports of the PDSCH and whether the different DMRS port groups correspond to the same data according to the DMRS port indication information;

in a fourth implementation, when the first information includes the NDI information of the closed transport block, if the NDI information of the closed transport block indicates data retransmission, the terminal device determines that the different DMRS port groups of the PDSCH correspond to the same data; and if the NDI information of the closed transmission block indicates new data transmission, the terminal device determines that the different DMRS port groups of the PDSCH correspond to different data;

in a fifth implementation, it is determined whether to perform the simultaneous repetition transmission of the PDSCH according to the first information, and it is determined whether the different DMRS port groups of the PDSCH correspond to the same data according to whether to perform the simultaneous repetition transmission of the PDSCH. In a specific implementation of this solution, if the simultaneous repetition transmission of the PDSCH is performed, it is determined that the different DMRS port groups of the PDSCH correspond to the same data, otherwise, the different DMRS port groups of the PDSCH correspond to different data.

In a specific implementation of this solution, the way in which the terminal device determines whether the simultaneous repetition transmission of the PDSCH is performed according to the first information is different according to a specific type of the first information, including at least following situations:

(1) the first information includes the scrambling mode of the CRC check codes of the DCI scheduling the PDSCH. If the CRC check codes of the DCI scheduling the PDSCH is scrambled by using a MCS-C-RNTI, the terminal device determines that the simultaneous repetition transmission of the PDSCH is performed; and if the CRC check codes of the DCI scheduling the PDSCH is scrambled by using a C-RNTI, the terminal device determines that the simultaneous repetition transmission of the PDSCH is not performed;

(2) the first information includes the high layer parameter for indicating whether to perform the simultaneous repetition transmission of the PDSCH. If the high layer parameter indicates performing the simultaneous repetition transmission of the PDSCH, the terminal device determines that the simultaneous repetition transmission of the PDSCH is performed; and if the high layer parameter indicates to not perform the simultaneous repetition transmission of the PDSCH, the terminal device determines that the simultaneous repetition transmission of the PDSCH is not performed;

(3) the first information includes the DMRS port indication information, and the terminal device determines the DMRS ports of the PDSCH and whether the simultaneous repetition transmission of the PDSCH is performed according to the DMRS port indication information, or determines whether the simultaneous repetition transmission of the PDSCH is performed according to a DMRS port index value indicated by the DMRS port indication information;

(4) the first information includes the NDI information of the closed transport block, and if the NDI information of the closed transport block indicates data retransmission, it is determined that the simultaneous repetition transmission of the PDSCH is performed; and if the NDI information of the closed transmission block indicates new data transmission, it is determined that the simultaneous repetition transmission of the PDSCH is not performed.

According to various implementations of this step, the terminal device determines whether the different DMRS port groups of the PDSCH correspond to the same data according to the first information, so that the PDSCH is received later.

S104: detecting the PDSCH according to whether the different DMRS port groups correspond to the same data.

In this step, if the terminal device determines that the different DMRS port groups correspond to different data, it may respectively perform detection according to each port group. As long as data corresponding to any DMRS port group is correctly detected, it is determined that downlink data is correctly received, and the terminal device feeds back ACK information to the network device.

If the terminal device determines that the different DMRS port groups correspond to the same data, data information obtained by performing demodulation based on the different DMRS port groups is combined to obtain data transmitted by the network device, or channels obtained by performing channel estimation based on the different DMRS port groups are combined and demodulation is performed according to the combined channels to obtain the data transmitted by the network device.

In a specific implementation of the technical solution in the present embodiment, it should be understood that the DMRS port groups contain k DMRS ports, where K=1, or K is the number of DMRS ports belonging to the same code division multiplexing (CDM) group among the DMRS ports of the PDSCH, or K=N/2, and N is the number of the DMRS ports of the PDSCH. It means that the number of ports contained in one DMRS port group is 1 (fixed value), or the number of the DMRS ports belonging to the same CDM group among the DMRS ports of DCI, or a half of the number of the DMRS ports in the PDSCH.

According to the data transmission method provided in the present embodiment, the network device determines whether the plurality of TRPs for the repetition transmission are used through carried data, and then indicates the first information to the terminal device in an implicit or explicit way. According to the received first information, the terminal device determines that the terminal device can determine whether the different DMRS port groups of the PDSCH carry the same or different data, and then detects the data according to whether the carried data are the same, thus meeting different requirements of URLLC and eMBB respectively and ensuring correct data transmission.

Figure 6:
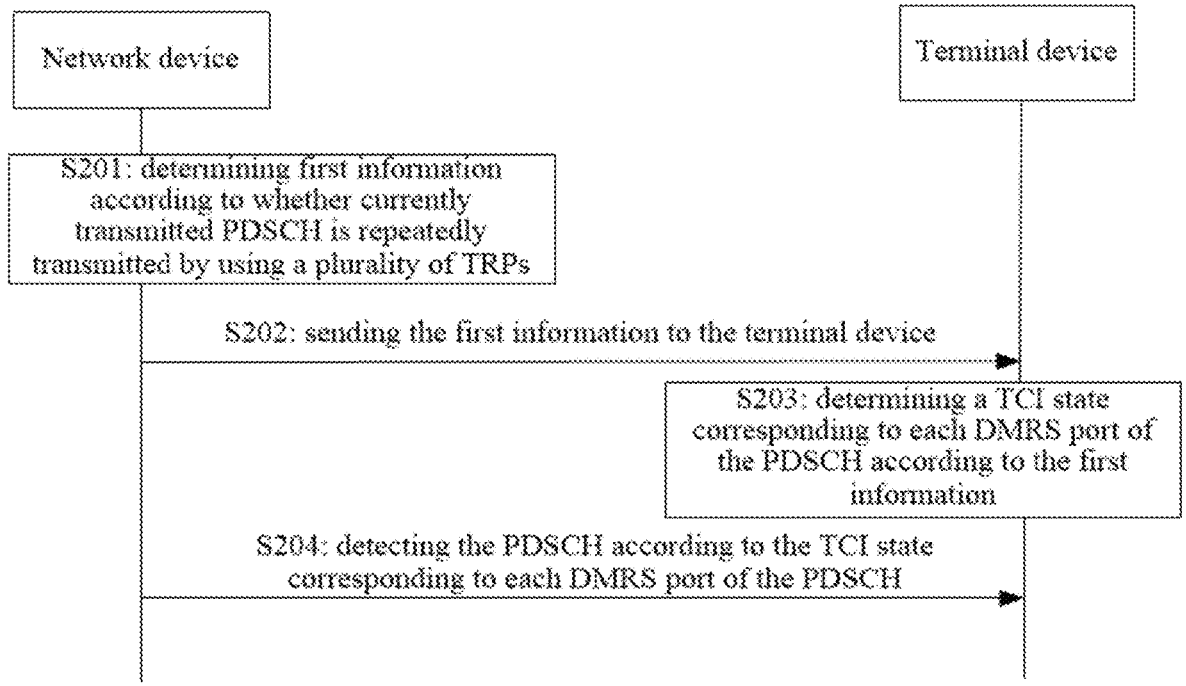
FIG. 6 is a flow diagram of a second embodiment of a data transmission method provided by an embodiment of the present application.

FIG. 6 is a flow diagram of a second embodiment of a data transmission method provided by an embodiment of the present application. As shown in FIG. 6, this method can be applied at least between a network device and a terminal device. The data transmission method provided by the present embodiment specifically includes following steps:

S201: determining first information according to whether currently transmitted PDSCH is repeatedly transmitted by using a plurality of TRPs.

S202: sending the first information to the terminal device.

The steps S201-S202 are the same as the implementation in S101-S102 in the first embodiment, and the implementation process in the previous embodiment may be referred to, and will not be described in detail herein.

S203: determining a TCI state corresponding to each DMRS port of the PDSCH according to the first information.

In an implementation of this solution, the terminal device may obtain TCI information from DCI scheduling the PDSCH, and the TCI information is used to indicate a plurality of TCI states.

In this step, after receiving the first information, the terminal device determines the TCI state corresponding to each DMRS port of the PDSCH according to indication of the first information. Since the first information includes various possible information, when the first information is different information, ways in which the TCI state corresponding to each DMRS port is determined are different, including at least following implementations:

- in a first implementation, when the first information includes a scrambling mode of the CRC check codes scheduling the DCI of the PDSCH, if the CRC check codes of the DCI scheduling the PDSCH is scrambled by using a MCS-C-RNTI, the terminal device determines that each DMRS port of the PDSCH corresponds to a plurality of TCI states; and if the CRC check codes of the DCI scheduling the PDSCH is scrambled by using a C-RNTI, it is determined that each DMRS port of the PDSCH corresponds to one of the plurality of TCI states;
- in a second implementation, the first information includes a high layer parameter for indicating whether to perform the simultaneous repetition transmission of the PDSCH. If the high layer parameter indicates to perform the simultaneous repetition transmission of the PDSCH, the terminal device determines that each DMRS port of the PDSCH corresponds to a plurality of TCI states; and if the high layer parameter indicates to not perform the simultaneous repetition transmission of the PDSCH, the terminal device determines that each DMRS port of the PDSCH corresponds to one of the plurality of TCI states;
- in a third implementation, the first information includes DMRS port indication information, and the terminal device determines the DMRS ports of the PDSCH and whether each DMRS port corresponds to a plurality of TCI states according to the DMRS port indication information; or the terminal device determines whether a DMRS port indicated by the DMRS port indication information corresponds to the plurality of TCI states according to a DMRS port index value indicated by the DMRS port indication information;
- in a fourth implementation, the first information includes NDI information of the closed transport block. If the NDI information of the closed transport block indicates data retransmission, the terminal device determines that each DMRS port of the PDSCH corresponds to a plurality of TCI states; and if the NDI information of the closed transmission block indicates new data transmission, the terminal device determines that each DMRS port of the PDSCH corresponds to one of the plurality of TCI states.

In specific implementations of the above several solutions, it should be understood that if the CRC check codes of the DCI scheduling the PDSCH is scrambled by using a C-RNTI, the terminal device does not expect TCI information to indicate a plurality of TCI states; or, if the high layer parameter indicates to not perform the simultaneous repetition transmission of the PDSCH, the terminal device does not expect the TCI information to indicate a plurality of TCI states; or, if the DMRS port indication information indicates that a current DMRS port only corresponds to one TCI state, the terminal device does not expect the TCI information to indicate a plurality of TCI states; or, if the NDI information of the closed transport block indicates new data transmission, the terminal device does not expect the TCI information to indicate a plurality of TCI states.

In a fifth implementation, the terminal device determines whether to perform the simultaneous repetition transmission of the PDSCH according to the first information, and then determines a TCI state corresponding to each DMRS port of the PDSCH according to whether to perform the simultaneous repetition transmission of the PDSCH. In a specific implementation of the solution, if the simultaneous repetition transmission of the PDSCH is performed, the terminal device determines that each DMRS port of the PDSCH corresponds to a plurality of TCI states, otherwise, each DMRS port of the PDSCH corresponds to one of the plurality of TCI states.

In a specific implementation of this solution, since the first information is different, ways to determine whether the simultaneous repetition transmission of the PDSCH is performed are also different, specifically including following situations:

(1) when the first information includes the scrambling mode of the CRC check codes of the DCI scheduling the PDSCH, if the CRC check codes of the DCI scheduling the PDSCH is scrambled by using a MCS-C-RNTI, the terminal device determines that the simultaneous repetition transmission of the PDSCH is performed; and if the CRC check codes of the DCI scheduling the PDSCH is scrambled by using a C-RNTI, the terminal device determines that the simultaneous repetition transmission of the PDSCH is not performed;

(2) the first information includes the high layer parameter for indicating whether to perform the simultaneous repetition transmission of the PDSCH. If the high layer parameter indicates to perform the simultaneous repetition transmission of the PDSCH, the terminal device determines that the simultaneous repetition transmission of the PDSCH is performed; and if the high layer parameter indicates to not perform the simultaneous repetition transmission of the PDSCH, the terminal device determines that the simultaneous repetition transmission of the PDSCH is not performed;

(3) if the first information includes DMRS port indication information, the terminal device determines the DMRS port of PDSCH and whether the simultaneous repetition transmission of the PDSCH is performed according to the DMRS port indication information, or determines whether the simultaneous repetition transmission of the PDSCH is performed according to the DMRS port index value indicated by the DMRS port indication information;

(4) when the first information includes the NDI information of the closed transport block, if the NDI information of the closed transport block indicates data retransmission, the terminal device determines that the simultaneous repetition transmission of the PDSCH is performed; and if the NDI information of the closed transmission block indicates new data transmission, the terminal device determines that the simultaneous repetition transmission of the PDSCH is not performed.

S204: detecting the PDSCH according to the TCI state corresponding to each DMRS port of the PDSCH.

In this step, after determining the TCI state corresponding to each DMRS port, the terminal device detects the PDSCH transmitted by the network device according to the TCI state. In a specific implementation process, if each DMRS port of the PDSCH corresponds to a plurality of TCI states, the plurality of TCI states are used to perform channel estimation on DMRS ports and/or reception of the PDSCH respectively; or, one TCI state is determined from the plurality of TCI states for performing channel estimation and/or PDSCH reception on the DMRS ports.

According to the data transmission method provided in the present embodiment, the network device determines whether the plurality of TRPs for the repetition transmission are used through carried data, and then indicates the first information to the terminal device in an implicit or explicit way. According to the received first information, the terminal device determines whether PDSCH transmission is diversity transmission, such as using some of TCI states or all of TCI states, thus meeting different requirements of URLLC and eMBB respectively and ensuring correct data transmission.

On the basis of the above embodiments, the implementation solutions of the data transmission method in specific application processes will be described in detail below through several specific examples.

Example 1

Step 1, the network device determines first information according to whether currently transmitted PDSCH is repeatedly transmitted by using a plurality of TRPs.

In the present embodiment, the network device determines whether the plurality of TRPs for the repetition transmission are used according to a service type of the PDSCH, for example, whether is an eMBB service or a URLLC service. For example, if a current service type is URLLC, it is determined that the plurality of TRPs for the repetition transmission are used; otherwise, the plurality of TRPs for the repetition transmission are not used.

In a specific implementation of this solution, if the network device uses the plurality of TRPs for the repetition transmission, the network device uses different TRPs to send PDSCHs carrying the same data. For example, PDSCHs sent by different TRPs are transmitted by using a same DMRS port or different DMRS ports. That is, PDSCHs sent by different TRPs are used to carry a same transport layer or different transport layers. For example, if the PDSCHs carry the same transport layer, the same DMRS port will be used; and if the PDSCHs carry the different transport layers, the different DMRS ports will be used, and the different DMRS ports belong to different CDM groups.

In this embodiment, PDSCH transport layers of different TRP transmission may use different sending beams, and accordingly, it may correspond to different TCI states.

Specifically, if the network device does not use the plurality of TRPs for repetition transmission, the network device uses a single TRP to transmit PDSCH, and at this time, the PDSCH only uses a single sending beam, i.e., it may only correspond to a single TCI state. In another embodiment, the network device may also use the plurality of TRPs to transmit a plurality of PDSCHs carrying different data. At this time, PDSCHs transmitted by different TRPs use different sending beams, i.e., it may correspond to a plurality of TCI states.

Step 2, the network device indicates the first information to the terminal device.

Specifically, the network device may indicate the first information through a scrambling mode of CRC check codes of DCI or high layer signaling or DCI signaling. For example, a high layer parameter for indicating whether to perform simultaneous repetition transmission of a PDSCH may be included in a configuration parameter of each CORESET and transmitted to the terminal device.

Step 3, the terminal device determines whether different DMRS port groups of the PDSCH correspond to same data according to the first information.

Method 1: the first information is a scrambling mode of CRC check codes of DCI scheduling the PDSCH, then the terminal device may determine according to the scrambling mode. Specifically, if the CRC check codes of the DCI scheduling the PDSCH are scrambled by using a MCS-C-RNTI, the different DMRS port groups of the PDSCH correspond to the same data; and if the CRC check codes of the DCI scheduling the PDSCH are scrambled by using a C-RNTI, the different DMRS port groups of the PDSCH correspond to different data. In addition, if the CRC check codes of the DCI scheduling the PDSCH are scrambled by using other RNTI, the terminal device may also consider that the different DMRS port groups of the PDSCH correspond to different data.

Method 2: the first information is a high layer parameter for indicating whether to perform simultaneous repetition transmission of the PDSCH, and the terminal device may determine according to the high layer parameter. Specifically, if the high layer parameter indicates to perform simultaneous repetition transmission of the PDSCH, the different DMRS port groups of the PDSCH correspond to the same data; and if the high layer parameter indicates to not perform simultaneous repetition transmission of the PDSCH, the different DMRS port groups of the PDSCH correspond to different data.

Method 3: the first information is DMRS port indication information. The DMRS port indication information indicates DMRS ports of the PDSCH and whether different DMRS port groups in the indicated DMRS ports correspond to same data, and the terminal device may directly determine according to the DMRS port indication information. For example, each index value of a DMRS port indicator indicates at least one DMRS port, and whether DMRS ports belonging to different CDM groups among these DMRS ports correspond to same data. Herein, DMRS ports belonging to a same CDM group form a DMRS port group. Specifically, an indication method in Table 1 may be used:

TABLE 1

DMRS port mapping table
One Codeword:
Codeword 0 enabled,
Codeword 1 disabled

| Value of antenna port indicator | Number of DMRS CDM group(s) without data | DMRS port(s) | The same data in different CDM groups |
|---|---|---|---|
| 0 | 1 | 0 | — |
| 1 | 1 | 1 | — |
| 2 | 1 | 0, 1 | — |

TABLE 1-continued

DMRS port mapping table
One Codeword:
Codeword 0 enabled,
Codeword 1 disabled

| Value of antenna port indicator | Number of DMRS CDM group(s) without data | DMRS port(s) | The same data in different CDM groups |
|---|---|---|---|
| 3 | 2 | 0 | — |
| 4 | 2 | 1 | — |
| 5 | 2 | 2 | — |
| 6 | 2 | 3 | — |
| 7 | 2 | 0, 1 | — |
| 8 | 2 | 2, 3 | — |
| 9 | 2 | 0-2 | — |
| 10 | 2 | 0-3 | — |
| 11 | 2 | 0, 2 | Yes |
| 12 | 2 | 0, 2 | No |
| 13-15 | Reserved | Reserved | Reserved | where values 11 and 12 of the DMRS port indicator both indicate ports {0} and {2} in two CDM groups, where the value 11 indicates that these two ports correspond to same data and the value 12 indicates that these two ports correspond to different data.

Method 4: the first information is NDI information of a closed transport block, and the terminal device may determine according to the NDI information. Specifically, if the NDI information of the closed transport block indicates data retransmission, the different DMRS port groups of the PDSCH correspond to same data; if the NDI information of the closed transport block indicates new data transmission, the different DMRS port groups of the PDSCH correspond to different data. In an implementation, when the NDI information of the closed transport block indicates data retransmission, the different DMRS port groups of the PDSCH correspond to different data; and when the NDI information of the closed transport block indicates new data transmission, the different DMRS port groups of the PDSCH correspond to the same data.

In the above method, the two DMRS ports correspond to the same data, which means that information source bits of the data on the two DMRS ports are the same, and coded bits may be the same or different.

In the above method, a number of DMRS ports included in a DMRS port group may be a fixed value, for example, the value is 1 or 2. The number of DMRS ports included in one DMRS port group may also be a number of DMRS ports belonging to a same CDM group among DMRS ports indicated by DCI scheduling a PDSCH. For example, if the network device indicates four DMRS ports by DCI scheduling a PDSCH, where the first two DMRS ports and the last two DMRS ports belong to different CDM groups, then the number of DMRS ports included in one DMRS port group is 2. The number of DMRS ports included in one DMRS port group may also be N/2, where N is the number of DMRS ports indicated by DCI. In the present application, N is an even number, i.e., the number of layers sent by different TRPs is the same.

In the above method, the different DMRS port groups correspond to independent TCI states. For example, if the network device indicates four DMRS ports by DCI scheduling a PDSCH, where the first two DMRS ports correspond to one DMRS port group and the last two DMRS ports correspond to another DMRS port group, the network device needs to indicate independent TCI states for the first two DMRS ports and the last two DMRS ports, for example, indicate two TCI states by DCI.

In an implementation solution of the present application, a CDM group represents at least one DMRS port occupying same physical resources, and these DMRS ports ensure orthogonality through different sequences or different orthogonality cover code (OCC) codes.

In the present solution, each DMRS port is used for one transport layer, and correspondingly, one DMRS port group is used for demodulation of one transport layer group. Therefore, DMRS ports in the present application may also be replaced by transport layers. For example, the terminal device determines whether the different DMRS port groups of the PDSCH correspond to the same data, it may also be equivalent to that the terminal device determines whether different transport layer groups carry the same data.

In the present solution, the terminal device may use the methods of the present embodiment only when certain agreed conditions are met, and when the agreed conditions are not met, default processing mode may be used instead of the methods of the present embodiment. Specifically, the agreed conditions may be that a PDSCH only carries one transport block, or that a PDSCH only contains two DMRS ports, or that DMRS ports of a PDSCH only belong to two CDM groups. When the terminal device meets the agreed conditions, the terminal device uses the technical solution of the present application, i.e., the terminal device determines whether the different DMRS port groups of the PDSCH correspond to the same data according to the first information. If the agreed conditions are not met, for example, when the PDSCH contains a plurality of transport blocks, the terminal device may directly determine that the different DMRS port groups of the PDSCH correspond to different data.

Step 4, the terminal device receives the PDSCH according to whether the different DMRS port groups of the PDSCH correspond to the same data.

In a specific implementation, if the different DMRS port groups of the PDSCH correspond to the same data, the terminal device combines data information obtained by performing demodulation based on the different DMRS port groups to obtain detected information. That is, the terminal device combines data detected on the different DMRS port groups to judge whether detection is correct or not. For example, the terminal device determines whether to feed back ACK or NACK according to whether the detected information is correct, for example, whether it can pass a CRC check. In another method, the terminal device may combine channels obtained by performing channel estimation based on the different DMRS port groups, and use the combined channels for data demodulation, i.e., the terminal device combines channels obtained by performing estimation on the different DMRS port groups, and perform demodulation on data based on the combined channels and received signals.

Or, in another implementation, if the different DMRS port groups of the PDSCH correspond to the same data, as long as the terminal device successfully detects data corresponding to one of the DMRS port groups, it is considered that a detection of the PDSCH is successful, and the terminal device may feedback ACK. Only when data corresponding to all DMRS port groups are not successfully detected, NACK will be fed back.

Figure 7:
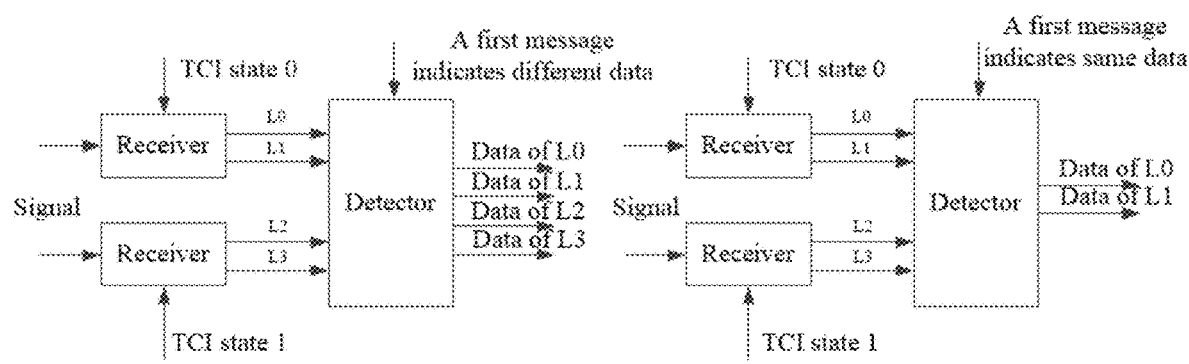
FIG. 7 is a schematic diagram of an example of a data transmission method provided by an embodiment of the present application.

FIG. 7 is a schematic diagram of an example of a data transmission method provided by an embodiment of the present application. As shown in FIG. 7, L0, L1, L2, and L3 respectively represent different ports. After a signal is transmitted to a terminal device side, when a first message indicates different data, a detector respectively detects each port and receives data of each port, i.e., data of L0, data of L1, data of L2, and data of L3. When the first message indicates same data, the detector may feedback a confirmation message to the network device if it correctly detects data from any port group, i.e., it can correctly detect data of L0 or L1.

Example 2

A process of the network device in Example 2 is the same as that in Example 1, which will not be repeated herein.

After the network device indicates the first information and the terminal device receives the first information, a processing procedure is as follows:

Step 1, the terminal device determines a TCI state corresponding to each DMRS port of the PDSCH according to the first information.

Several specific implementation methods of the first information are consistent with the Example 1, which will not be repeated herein.

Specifically, DCI for scheduling a PDSCH contains TCI information, and the TCI information indicates a plurality of TCI states. For example, TCI information may indicate 2 TCI states. At this time, the terminal device may determine the TCI state corresponding to each DMRS port of the PDSCH by one of following methods, for example, determine whether each DMRS port corresponds to the plurality of TCI states indicated by the TCI information.

Method 1: the first information is a scrambling mode of CRC check codes of DCI scheduling the PDSCH, then the terminal device determines according to the scrambling mode. Specifically, if the CRC check codes of the DCI scheduling the PDSCH is scrambled by using a MCS-C-RNTI, it is determined that each DMRS port of the PDSCH corresponds to a plurality of TCI states; and if the CRC check codes of the DCI scheduling the PDSCH is scrambled by using a C-RNTI, it is determined that each DMRS port of the PDSCH corresponds to one of the plurality of TCI states, for example, the first TCI state. In addition, if the CRC check codes of the DCI scheduling the PDSCH are scrambled by using other RNTI, the terminal device may also consider that each DMRS port of the PDSCH corresponds to one of the plurality of TCI states.

Method 2: the first information is a high layer parameter for indicating whether to perform simultaneous repetition transmission of the PDSCH, and the terminal device determines according to the high layer parameter. Specifically, if the high layer parameter indicates to perform simultaneous repetition transmission of the PDSCH, it is determined that each DMRS port of the PDSCH corresponds to a plurality of TCI states; and if the high layer parameter indicates to not perform simultaneous repetition transmission of the PDSCH, it is determined that each DMRS port of the PDSCH corresponds to one of the plurality of TCI states, for example, the first TCI state.

Method 3: the first information is DMRS port indication information. The DMRS port indication information is used to indicate DMRS ports of the PDSCH and whether each DMRS port of the indicated DMRS port corresponds to a plurality of TCI states, and the terminal device may directly determine whether each DMRS port corresponds to the plurality of TCI states according to the DMRS port indication information. For example, each index value of a DMRS port indicator corresponds to a DMRS port set, and whether each DMRS port in these DMRS ports corresponds to a plurality of TCI states. For example, an indication method in Table 2 below is used:

TABLE 2

DMRS port mapping table
One Codeword:
Codeword 0 enabled,
Codeword 1 disabled

| Value of antenna port indicator | Number of DMRS CDM group(s) without data | DMRS port(s) | Multiple TCI states applied or not |
|---|---|---|---|
| 0 | 1 | 0 | Yes |
| 1 | 1 | 1 | Yes |
| 2 | 2 | 0 | Yes |
| 3 | 2 | 1 | Yes |
| 4 | 2 | 2 | Yes |
| 5 | 2 | 3 | Yes |
| 6 | 1 | 0 | No |
| 7 | 1 | 1 | No |
| 8 | 2 | 0 | No |
| 9 | 2 | 1 | No |
| 10 | 2 | 2 | No |
| 11 | 2 | 3 | No |
| 13-15 | Reserved | Reserved | Reserved | where the indicator index values 0-5 indicate that the configured plurality of TCI states are used, and the indicator index values 6-11 indicate that the plurality of TCI states are not used, such as one of the configured plurality of TCI states are used.

Method 4: the first information is DMRS port indication information, and the DMRS port indication information indicates DMRS ports of the PDSCH, and the number of TCI states corresponding to different DMRS ports may be different, then the terminal device may determine whether the indicated ports correspond to a plurality of TCI states according to indicated DMRS port index. For example, one DMRS port indicated by the DMRS port indicator may correspond to a plurality of TCI states; and another DMRS port may only correspond to one TCI state, and the terminal device determines the TCI state corresponding to this port through the DMRS port indicated by DCI. For example, an indication method in Table 3 below is used:

TABLE 3

DMRS port mapping table
One Codeword:
Codeword 0 enabled,
Codeword 1 disabled

| Value of antenna port indicator | Number of DMRS CDM group(s) without data | DMRS port(s) | Multiple TCI states applied or not |
|---|---|---|---|
| 0 | 1 | 0 | Yes |
| 1 | 1 | 1 | No |
| 2 | 2 | 0 | Yes |
| 3 | 2 | 1 | No |
| 4 | 2 | 2 | Yes |
| 5 | 2 | 3 | No |
| 6-7 | Reserved | Reserved | Reserved | where the DMRS ports 0 and 2 correspond to a plurality of TCI states, while the DMRS ports 1 and 3 correspond to one TCI state.

Method 5: the first information is NDI information of the closed transport block, and the terminal device determines according to the NDI indication information. Specifically, if the NDI information of the closed transport block indicates data retransmission, the terminal device determines that each DMRS port of the PDSCH corresponds to a plurality of TCI states; and if the NDI information of the closed transmission block indicates new data transmission, the terminal device determines that each DMRS port of the PDSCH corresponds to one of the plurality of TCI states, for example, a first TCI state. In an implementation, when the NDI information of the closed transport block indicates data retransmission, each DMRS port of the PDSCH corresponds to one TCI state of the plurality of TCI states, for example, the first TCI state; when the NDI information of the closed transmission block indicates new data transmission, each DMRS port of the PDSCH corresponds to the plurality of TCI States.

It should be noted that if only one TCI state is indicated in DCI, the terminal device may directly apply the TCI state to an indicated DMRS port without judging according to the first message.

In another implementation, if the first message indicates that a current PDSCH is not repeatedly transmitted. For example, the CRC check codes of the DCI scheduling the PDSCH is scrambled by using a C-RNTI; or, if the high layer parameter indicates to not perform the simultaneous repetition transmission of the PDSCH; or, if the DMRS port indication information indicates that a current DMRS port only corresponds to one TCI state; or, if the NDI information of the closed transport block indicates new data transmission, the terminal device does not expect TCI information to indicate a plurality of TCI states, and the TCI information may only contain one TCI state at this time, otherwise the terminal device will treat as an error case and will not receive the PDSCH.

In the present embodiment, all DMRS ports of the PDSCH are contained in a same CDM group, or the DMRS ports of the PDSCH are a single DMRS port.

In a specific implementation of the present application, each DMRS port is used for one transport layer, thus the DMRS port in the present application may also be replaced by a transport layer. For example, the TCI state corresponding to each DMRS port may also be equivalent to a TCI state corresponding to each transport layer.

In the present solution, the terminal device may use the methods of the present embodiment only when certain agreed conditions are met, and when the agreed conditions are not met, default processing mode may be used instead of the methods of the present embodiment. Specifically, the agreed conditions may be that a PDSCH only carries one transport block, or that a PDSCH only contains two DMRS ports, or that DMRS ports of a PDSCH only belong to two CDM groups. When the terminal device meets the agreed conditions, the terminal device uses the technical solution of the present application, i.e., the terminal device determines the TCI state corresponding to each DMRS port of the PDSCH according to the first information. If the agreed conditions are not met, for example, when the PDSCH contains a plurality of transport blocks, the terminal device may directly determine that each DMRS port of the PDSCH corresponds to one TCI state.

Step 2, the terminal device receives the PDSCH according to the TCI state corresponding to each DMRS port of the PDSCH.

Specifically, if one DMRS port of the PDSCH corresponds to a plurality of TCI states, the terminal device uses the plurality of TCI states to perform channel estimation and/or PDSCH reception on the DMRS port respectively, or the terminal device determines one TCI state from the plurality of TCI states to perform the channel estimation and the PDSCH reception on the DMRS port.

For example, the terminal device may respectively perform the channel estimation and the PDSCH reception on the DMRS port based on each of the plurality of TCI states (the channel estimation and the PDSCH reception use a same TCI state). As long as the terminal device successfully detects the PDSCH by using a certain TCI state, the detection on other TCI states will not be necessary, and the terminal device directly feeds back ACK to the network device.

In another implementation, if the terminal device has a plurality of panels for receiving a downlink PDSCH, the downlink PDSCH may be received on different panels using different TCI states among the plurality of TCI states. If the terminal device has only one panel for downlink PDSCH reception, only one TCI state can be selected for PDSCH reception. For example, the terminal device may select TCI corresponding to a better beam according to reference signal receiving power (RSRP) of beams corresponding to different TCI.

Figure 8:
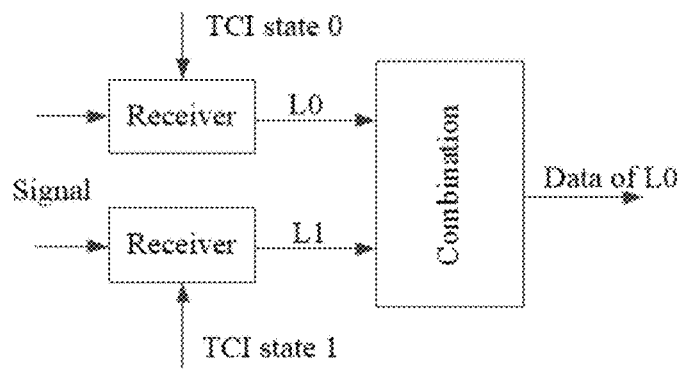
FIG. 8 is a schematic diagram of another example of a data transmission method provided by an embodiment of the present application.

According to descriptions of the above solution, FIG. 8 is a schematic diagram of another example of a data transmission method provided by an embodiment of the present application. As shown in FIG. 8, in this solution, each DMRS port corresponds to two TCI states, and L0 and L1 respectively represent different ports. After a signal is transmitted to a terminal device side, a receiver of the terminal device selects one of TCI state 0 and TCI state 1 for performing channel estimation and/or data reception on the DMRS port. In this example, port L0 is selected and data of L0 is detected and obtained.

Example 3

An implementation process on a network device side is the same as that in Example 1, which will not be repeated herein.

After a network device indicates first information and a terminal device receives the first information, a processing procedure is as follows:

Step 1, the terminal device determines whether to perform simultaneous repetition transmission of a PDSCH according to the first information; and according to whether to perform the simultaneous repetition transmission of the PDSCH, it is determined whether different DMRS port groups of the PDSCH correspond to same data, or determined a TCI state corresponding to each DMRS port of the PDSCH. A case that the first information specifically includes is the same as that of the above examples.

Specifically, determining, by the terminal device, whether to perform the simultaneous repetition transmission of the PDSCH according to the first information, includes at least one of the following:

method 1: the first information is a scrambling mode of CRC check codes of DCI scheduling the PDSCH, then the terminal device determines according to the scrambling mode. Specifically, if the CRC check codes of the DCI scheduling the PDSCH is scrambled by using a MCS-C-RNTI, it is determined that the simultaneous repetition transmission of the PDSCH is performed; and if the CRC check codes of the DCI scheduling the PDSCH is scrambled by using a C-RNTI, it is determined that the simultaneous repetition transmission of the PDSCH is not performed. In addition, if the CRC check codes of the DCI scheduling the PDSCH are scrambled by using other RNTI, the terminal device may also consider that the simultaneous repetition transmission of the PDSCH is not performed;

method 2: the first information is a high layer parameter for indicating whether to perform the simultaneous repetition transmission of the PDSCH. If the high layer parameter indicates to perform the simultaneous repetition transmission of the PDSCH, the terminal device determines that the simultaneous repetition transmission of the PDSCH is performed; and if the high layer parameter indicates to not perform the simultaneous repetition transmission of the PDSCH, the terminal device determines that the simultaneous repetition transmission of the PDSCH is not performed;

method 3: the first information is DMRS port indication information, and the DMRS port indication information simultaneously indicates DMRS ports of the PDSCH and whether the simultaneous repetition transmission of the PDSCH is performed. The terminal device may directly determine whether the simultaneous repetition transmission of the PDSCH is performed according to the DMRS port indication information. For example, each index value of a DMRS port indicator corresponds to a DMRS port set, and whether the simultaneous repetition transmission of the PDSCH is performed. For example, an indication method in Table 4 below is used:

TABLE 4

DMRS port mapping table
One Codeword:
Codeword 0 enabled,
Codeword 1 disabled

| Value of antenna port indicator | Number of DMRS CDM group(s) without data | DMRS port(s) | Repetition or not |
|---|---|---|---|
| 0 | 1 | 0 | Yes |
| 1 | 1 | 1 | Yes |
| 2 | 2 | 0 | Yes |
| 3 | 2 | 1 | Yes |
| 4 | 2 | 2 | Yes |
| 5 | 2 | 3 | Yes |
| 6 | 1 | 0 | No |
| 7 | 1 | 1 | No |
| 8 | 2 | 0 | No |
| 9 | 2 | 1 | No |
| 10 | 2 | 2 | No |
| 11 | 2 | 3 | No |
| 13-15 | Reserved | Reserved | Reserved | where the indicator index values 0-5 indicate that the simultaneous repetition transmission of the PDSCH is performed, and the indicator index values 6-11 indicate that the simultaneous repetition transmission is not performed;

method 4: the first information is DMRS port indication information, and the DMRS port indication information indicates DMRS ports of PDSCH. Different DMRS ports correspond to different repetition transmission configurations, and the terminal device determines whether to perform repetition transmission of corresponding data according to an indicated DMRS port index. For example, one DMRS port indicated by a DMRS port indicator may correspond to the simultaneous repetition transmission, and another DMRS port may only correspond to no simultaneous repetition transmission. For example, an indication method in Table 5 below is used:

TABLE 5

DMRS port mapping table
One Codeword:
Codeword 0 enabled,
Codeword 1 disabled

| Value of antenna port indicator | Number of DMRS CDM group(s) without data | DMRS port(s) | Repetition or not |
|---|---|---|---|
| 0 | 1 | 0 | Yes |
| 1 | 1 | 1 | No |
| 2 | 2 | 0 | Yes |
| 3 | 2 | 1 | No |
| 4 | 2 | 2 | Yes |
| 5 | 2 | 3 | No |
| 6-7 | Reserved | Reserved | Reserved | where DMRS port 0 and port 2 correspond to that the simultaneous repetition transmission is performed, while DMRS port 1 and port 3 correspond to that the simultaneous repetition transmission is not performed.

Figure 9:
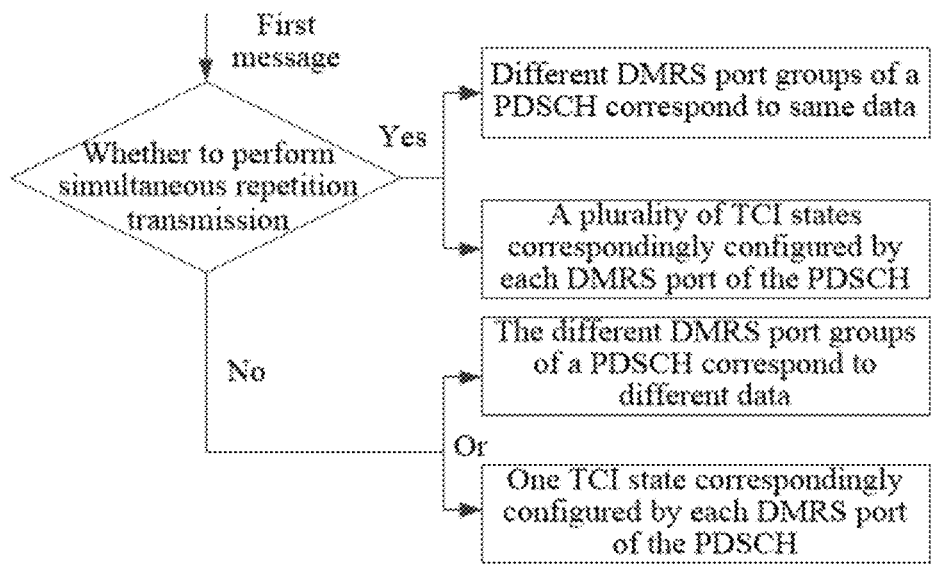
FIG. 9 is a flow diagram of yet another example of a data transmission method provided by an embodiment of the present application.

FIG. 9 is a flow diagram of yet another example of a data transmission method provided by an embodiment of the present application. As shown in FIG. 9, in a specific implementation of this solution, a terminal device determines whether different DMRS port groups of a PDSCH correspond to same data or determines a TCI state corresponding to each DMRS port of the PDSCH according to whether simultaneous repetition transmission of the PDSCH is performed, and a specific implementation of this solution includes:

if the simultaneous repetition transmission of the PDSCH is performed, it is determined that the different DMRS port groups of the PDSCH correspond to the same data, otherwise, correspond to different data;

or, if the simultaneous repetition transmission of the PDSCH is performed, it is determined that each DMRS port of the PDSCH corresponds to all TCI states indicated by the current DCI; otherwise, it is determined that each DMRS port of the PDSCH corresponds to one TCI state indicated by the current DCI. It should be noted that if only one TCI state is indicated in the DCI, the terminal device may directly apply the TCI state to an indicated DMRS port without performing the judgment according to whether the simultaneous repetition transmission is performed.

In the present embodiment, a definition of a DMRS port group may refer to Example 1.

In the present embodiment, DMRS ports of different DMRS port groups correspond to independent TCI states.

In the present technical solution, each DMRS port is used for one transport layer. Accordingly, one DMRS port group is used for demodulation of one transport layer group. Therefore, DMRS ports in the present application may also be replaced by a transport layer. For example, whether the different DMRS port groups correspond to the same data may also be equivalent to whether different transport layer groups carry the same data. The TCI state corresponding to each DMRS port may also be equivalent to a TCI state corresponding to each transport layer.

In the present embodiment, the terminal device may use the methods of the present embodiment only when certain agreed conditions are met, and when the agreed conditions are not met, default processing mode may be used instead of the methods of the present embodiment. Specifically, the agreed conditions may be that a PDSCH only carries one transport block, or that a PDSCH only contains two DMRS ports, or that DMRS ports of a PDSCH only belong to two CDM groups. When the terminal device meets the agreed conditions, the terminal device determines whether to perform the simultaneous repetition transmission of the PDSCH according to the first information. If the agreed conditions are not met, for example, when the PDSCH contains a plurality of transport blocks, the terminal device may directly determine that the simultaneous repetition transmission of the PDSCH is not performed.

In another implementation, if a first message indicates that the current PDSCH is not repeatedly transmitted, for example, the CRC check codes of the DCI scheduling the PDSCH is scrambled by using a C-RNTI; or, if the high layer parameter indicates to not perform the simultaneous repetition transmission of the PDSCH; or, if the DMRS port indication information indicates to not perform the simultaneous repetition transmission currently, or if the NDI information of the closed transport block indicates new data transmission, the terminal device does not expect TCI information to indicate a plurality of TCI states. That is, the TCI information may only contain one TCI state at this time; otherwise, the terminal device will treat as an error case and will not receive PDSCH.

Step 2, the terminal device receives the PDSCH according to whether the different DMRS port groups of the PDSCH correspond to the same data or the TCI state corresponding to each DMRS port of the PDSCH.

If the different DMRS port groups of the PDSCH correspond to the same data, the terminal device combines data information obtained by performing demodulation based on the different DMRS port groups to obtain detected information. That is, the terminal device combines data obtained by performing detection on the different DMRS port groups to judge whether detection is correct or not. For example, the terminal device determines whether to feed back ACK or NACK according to whether the detected information is correct, for example, whether it can pass a CRC check. In another method, the terminal device may combine channels obtained by performing channel estimation based on the different DMRS port groups, and use the combined channels for data demodulation. That is, the terminal device combines channels obtained by performing estimation on the different DMRS port groups, and performs demodulation on data based on the combined channels and received signals.

Or, if the different DMRS port groups of the PDSCH correspond to the same data, as long as the terminal device successfully detects data corresponding to one of the DMRS port groups, it is considered that a detection of the PDSCH is successful, and the terminal device may feedback ACK. Only when data corresponding to all DMRS port groups are not successfully detected, NACK will be fed back.

Specifically, if one DMRS port of the PDSCH corresponds to a plurality of TCI states, the terminal device uses the plurality of TCI states to perform channel estimation and/or PDSCH reception on the DMRS port respectively, or the terminal device determines one TCI state from the plurality of TCI states to perform the channel estimation and/or the PDSCH reception on the DMRS port.

Based on the technical solutions provided by the above several examples, in the data transmission methods provided by the present application, the terminal device may know whether currently transmitted data is repeatedly transmitted simultaneously, so that whether a plurality of transport layers scheduled by a network device side carry same data is determined, or whether each DMRS port configured by the network device is transmitted through the plurality of TRPs (i.e., whether it corresponds to a plurality of TCI states at the same time) is determined, so that corresponding reception is performed. According to the methods, the network device can flexibly schedule data of eMBB or URLLC, improve reliability through repetition transmission of the plurality of TRPs when scheduling URLLC data, and improve throughput by transmitting different data through different TRPs when scheduling eMBB data, thereby respectively meeting different respective requirements of eMBB and URLLC.

Figure 10:
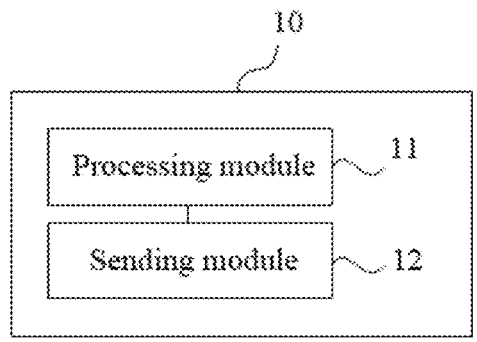
FIG. 10 is a structural schematic diagram of a first embodiment of a data transmission apparatus provided by an embodiment of the present application.

FIG. 10 is a structural schematic diagram of a first embodiment of a data transmission apparatus provided by an embodiment of the present application. As shown in FIG. 10, the data transmission apparatus 10 includes:

a processing module 11, configured to: determine first information according to whether currently transmitted PDSCH is repeatedly transmitted by using a plurality of TRPs, where the first information is used for a terminal device to determine whether different DMRS port groups of the PDSCH correspond to same data, or to determine a TCI state corresponding to each DMRS port of the PDSCH; and a sending module 12, configured to send the first information to the terminal device.

The data transmission apparatus provided by the present embodiment is used to implement the technical solutions on a network device side in any one of the foregoing method embodiments, and their implementation principles and technical effects are similar. First information is indicated to a terminal device in an implicit or explicit way, and the terminal device determines that the terminal device can determine whether PDSCH transmission is diversity transmission according to the received first information, such as using some of TCI states or all of TCI states, and whether same or different data is carried by different DMRS port groups, thereby meeting different requirements of URLLC and eMBB respectively, and ensuring that data transmission is correct.

On the basis of the above embodiments, the first information includes any one of following information:
a scrambling mode of CRC check codes of DCI scheduling the PDSCH;
a high layer parameter for indicating whether to perform simultaneous repetition transmission of the PDSCH;
DMRS port indication information; and
NDI information of a closed transport block.

Further, the processing module 11 is further configured to:
determine whether the PDSCH is repeatedly transmitted by using a plurality of TRPs according to a service type of data carried by the PDSCH, where the service type includes eMBB or URLLC.

The data transmission apparatus provided by the present embodiment is used to implement the technical solutions on the network device side in any one of the foregoing method embodiments, and their implementation principles and technical effects are similar, which will not be repeated herein.

Figure 11:
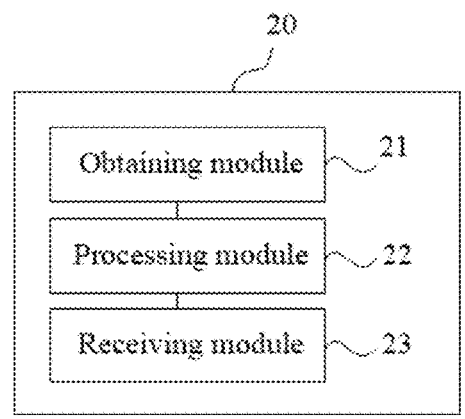
FIG. 11 is a structural schematic diagram of a second embodiment of a data transmission apparatus provided by an embodiment of the present application.

FIG. 11 is a structural schematic diagram of a second embodiment of a data transmission apparatus provided by an embodiment of the present application. As shown in FIG. 11, the data transmission apparatus 20 includes:

an obtaining module 21, configured to obtain first information indicated by a network device;
a processing module 22, configured to: determine whether different DMRS port groups of the PDSCH correspond to same data according to the first information; and
a receiving module 23, configured to: detect the PDSCH according to whether the different DMRS port groups correspond to the same data.

The data transmission apparatus provided by the present embodiment is used to implement the technical solutions on a terminal device side in any one of the foregoing method embodiments, and their implementation principles and technical effects are similar. First information on a network device side is received, and according to the received first information, it is determined that the terminal device can determine whether PDSCH transmission is diversity transmission according to the first information, such as using some of TCI states or all of TCI states, and whether same or different data is carried by different DMRS port groups, thereby meeting different requirements of URLLC and eMBB respectively, and ensuring that data transmission is correct.

On the basis of the above embodiments, in a specific implementation of the data transmission apparatus 20, the first information includes any one of following information:
  a scrambling mode of CRC check codes of DCI scheduling the PDSCH;
  a high layer parameter for indicating whether to perform simultaneous repetition transmission of the PDSCH;
  DMRS port indication information; and
  NDI information of a closed transport block.

In an implementation, the first information includes the scrambling mode of the CRC check codes of the DCI scheduling the PDSCH, then the processing module 22 is specifically configured to:
  if the CRC check codes of the DCI of the PDSCH are scrambled by using a MCS-C-RNTI, determine that the different DMRS port groups of the PDSCH correspond to the same data; and
  if the CRC check codes of the DCI scheduling the PDSCH are scrambled by using a C-RNTI, determine that the different DMRS port groups of the PDSCH correspond to different data.

In an implementation, the first information includes the high layer parameter for indicating whether to perform the simultaneous repetition transmission of the PDSCH, then the processing module 22 is specifically configured to:
  if the high layer parameter indicates to perform the simultaneous repetition transmission of the PDSCH, determine that the different DMRS port groups of the PDSCH correspond to the same data; and
  if the high layer parameter indicates to not perform the simultaneous repetition transmission of the PDSCH, determine that the different DMRS port groups of the PDSCH correspond to different data.

In an implementation, the first information includes the DMRS port indication information, then the processing module 22 is specifically configured to:
  determine DMRS ports of the PDSCH and whether the different DMRS port groups correspond to the same data according to the DMRS port indication information.

In an implementation, the first information includes the NDI information of the closed transport block, then the processing module 22 is specifically configured to:
  if the NDI information of the closed transport block indicates data retransmission, determine that the different DMRS port groups of the PDSCH correspond to the same data; and
  if the NDI information of the closed transport block indicates new data transmission, determine that the different DMRS port groups of the PDSCH correspond to different data.

In an implementation, the processing module 22 is specifically configured to:
  determine whether to perform the simultaneous repetition transmission of the PDSCH according to the first information; and
  determine whether the different DMRS port groups of the PDSCH correspond to the same data according to whether the simultaneous repetition transmission of the PDSCH is performed.

In an implementation, the processing module 22 is specifically configured to:
  if the simultaneous repetition transmission of the PDSCH is performed, determine that the different DMRS port groups of the PDSCH correspond to the same data, otherwise, the different DMRS port groups of the PDSCH correspond to different data.

In an implementation, the first information includes the scrambling mode of the CRC check codes of the DCI scheduling the PDSCH, then the processing module 22 is specifically configured to:
  if the CRC check codes of the DCI scheduling the PDSCH is scrambled by using an MCS-C-RNTI, determine that the simultaneous repetition transmission of the PDSCH is performed; and
  if the CRC check codes of the DCI scheduling the PDSCH is scrambled by using a C-RNTI, determine that the simultaneous repetition transmission of the PDSCH is not performed;
  or,
  the first information includes the high layer parameter for indicating whether to perform the simultaneous repetition transmission of the PDSCH, then the processing module 22 is specifically configured to:
  if the high layer parameter indicates to perform the simultaneous repetition transmission of the PDSCH, determine that the simultaneous repetition transmission of the PDSCH is performed; and
  if the high layer parameter indicates to not perform the simultaneous repetition transmission of the PDSCH, determine that the simultaneous repetition transmission of the PDSCH is not performed;
  or,
  the first information includes the DMRS port indication information, then the processing module 22 is specifically configured to:
  determines the DMRS ports of the PDSCH and whether the simultaneous repetition transmission of the PDSCH is performed according to the DMRS port indication information, or determines whether the simultaneous repetition transmission of the PDSCH is performed according to a DMRS port index value indicated by the DMRS port indication information.
  or,
  the first information includes the NDI information of the closed transport block, then the processing module 22 is specifically configured to:
  if the NDI information of the closed transport block indicates data retransmission, determine that the simultaneous repetition transmission of the PDSCH is performed; and
  and if the NDI information of the closed transmission block indicates new data transmission, determine that the simultaneous repetition transmission of the PDSCH is not performed.

In an implementation, the receiving module 23 is specifically configured to:
  if the different DMRS port groups of the PDSCH correspond to the same data, combine data information obtained by performing demodulation based on the different DMRS port groups to obtain data transmitted by the network device, or combine channels obtained by performing channel estimation based on the different DMRS port groups and perform demodulation according to a combined channel to obtain data transmitted by the network device.

In an implementation, the data transmission apparatus 20 further includes:

a sending module 24, configured to: if the different DMRS port groups of the PDSCH correspond to the same data, and data corresponding to any DMRS port group is correctly detected, feedback ACK information to the network device for the data transmitted by the network device.

In any one of the above implementations, the DMRS port groups contain k DMRS ports, where K=1, or K is a number of DMRS ports belonging to a same CDM group among the DMRS ports of the PDSCH, or K=N/2, and N is a number of the DMRS ports of the PDSCH.

The data transmission apparatus provided by any one of the above embodiments is used to implement the technical solutions on the terminal device side in any one of the foregoing method embodiments, and their implementation principles and technical effects are similar, which will not be repeated herein.

In another implementation of the terminal device, in the data transmission apparatus 20, the obtaining module 21 is configured to obtain the first information indicated by the network device;

the processing module 22 is configured to determine a TCI state corresponding to each DMRS port of the PDSCH according to the first information; and the receiving module 23 is configured to detect the PDSCH according to the TCI state corresponding to each DMRS port of the PDSCH.

In a specific implementation of the solution, the first information includes any one of the following information:

a scrambling mode of CRC check codes of DCI scheduling the PDSCH;

a high layer parameter for indicating whether to perform simultaneous repetition transmission of the PDSCH;

DMRS port indication information; and

NDI information of a closed transport block.

In an implementation, the processing module 22 is further configured to:

obtain TCI information from the DCI scheduling the PDSCH, and the TCI information indicates a plurality of TCI states.

In an implementation, the first information includes the scrambling mode of the CRC check codes of the DCI scheduling the PDSCH, then the processing module 22 is specifically configured to:

if the CRC check codes of the DCI scheduling the PDSCH are scrambled by using an MCS-C-RNTI, determine that each DMRS port of the PDSCH corresponds to a plurality of TCI states; and if the CRC check codes of the DCI scheduling the PDSCH are scrambled by using a C-RNTI, determine that each DMRS port of the PDSCH corresponds to one of the plurality of TCI states.

In an implementation, the first information includes the high layer parameter for indicating whether to perform the simultaneous repetition transmission of the PDSCH, then the processing module 22 is specifically configured to:

if the high layer parameter indicates to perform the simultaneous repetition transmission of the PDSCH, determine that each DMRS port of the PDSCH corresponds to a plurality of TCI states; and if the high layer parameter indicates to not perform the simultaneous repetition transmission of the PDSCH, determine that each DMRS port of the PDSCH corresponds to one of the plurality of TCI states.

In an implementation, the first information includes DMRS port indication information, then the processing module is specifically configured to:

determine DMRS ports of the PDSCH and whether each DMRS port corresponds to a plurality of TCI states according to the DMRS port indication information;

or, determine whether a DMRS port indicated by the DMRS port indication information corresponds to a plurality of TCI states according to a DMRS port index value indicated by the DMRS port indication information.

In an implementation, the first information includes the NDI information of the closed transport block, then the processing module is specifically configured to:

if the NDI information of the closed transport block indicates data retransmission, determine that each DMRS port of the PDSCH corresponds to a plurality of TCI states; and if the NDI information of the closed transmission block indicates new data transmission, determine that each DMRS port of the PDSCH corresponds to one of the plurality of TCI states.

In an implementation, the processing module 22 is specifically configured to:

determine whether to perform the simultaneous repetition transmission of the PDSCH according to the first information; and determine a TCI state corresponding to each DMRS port of the PDSCH according to whether the simultaneous repetition transmission of the PDSCH is performed.

In an implementation, the processing module 22 is specifically configured to:

if the simultaneous repetition transmission of the PDSCH is performed, determine that each DMRS port of the PDSCH corresponds to a plurality of TCI states, otherwise, each DMRS port of the PDSCH corresponds to one of the plurality of TCI states.

In an implementation, the first information includes the scrambling mode of the CRC check codes of the DCI scheduling the PDSCH, then the processing module 22 is specifically configured to:

if the CRC check codes of the DCI scheduling the PDSCH is scrambled by using an MCS-C-RNTI, determine that the simultaneous repetition transmission of the PDSCH is performed; and if the CRC check codes of the DCI scheduling the PDSCH is scrambled by using a C-RNTI, determine that the simultaneous repetition transmission of the PDSCH is not performed;

or, the first information includes the high layer parameter for indicating whether to perform the simultaneous repetition transmission of the PDSCH, then the processing module 22 is specifically configured to:

if the high layer parameter indicates to perform the simultaneous repetition transmission of the PDSCH is performed, determine that the simultaneous repetition transmission of the PDSCH is performed; and if the high layer parameter indicates to not perform the simultaneous repetition transmission of the PDSCH, determine that the simultaneous repetition transmission of the PDSCH is not performed.

or, the first information includes the DMRS port indication information, then the processing module 22 is specifically configured to:

determine the DMRS ports of the PDSCH and whether the simultaneous repetition transmission of the PDSCH is performed according to the DMRS port indication information, or determine whether the simultaneous repetition transmission of the PDSCH is performed according to a DMRS port index value indicated by the DMRS port indication information;

or, the first information includes the NDI information of the closed transport block, then the processing module 22 is specifically configured to:

if the NDI information of the closed transport block indicates data retransmission, determine that the simultaneous repetition transmission of the PDSCH is performed; and if the NDI information of the closed transmission block indicates new data transmission, determine that the simultaneous repetition transmission of the PDSCH is not performed.

In an implementation, the receiving module 23 is specifically configured to:

if each DMRS port of the PDSCH corresponds to a plurality of TCI states, use the plurality of TCI states to perform channel estimation on DMRS ports and/or reception of the PDSCH respectively;

or, determine one TCI state from the plurality of TCI states for performing channel estimation and/or PDSCH reception on the DMRS ports.

The data transmission apparatus provided by any one of the above embodiments is used to implement the technical solutions on the terminal device side in any one of the foregoing method embodiments, and their implementation principles and technical effects are similar, which will not be repeated herein.

Figure 12:
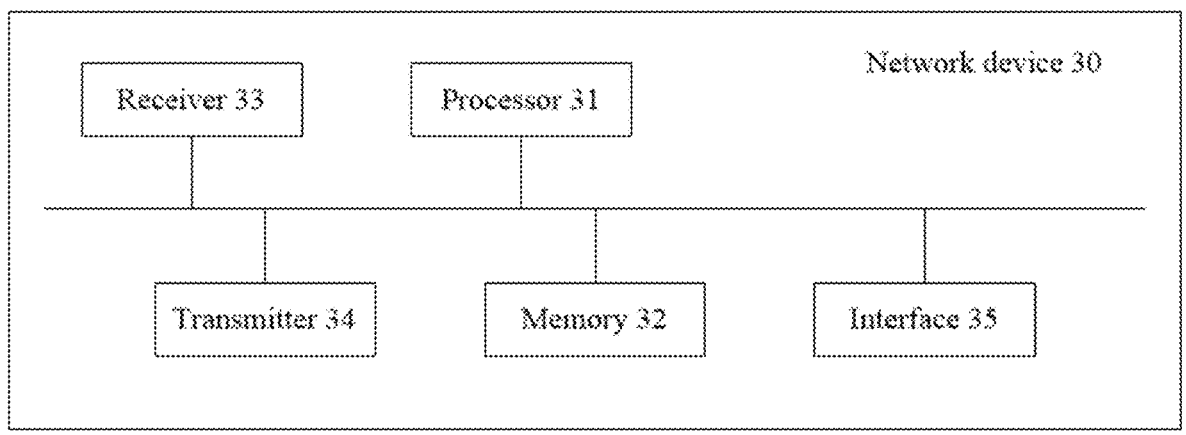
FIG. 12 is a structural schematic diagram of a first embodiment of a network device provided by an embodiment of the present application.

FIG. 12 is a structural schematic diagram of a first embodiment of a network device provided by an embodiment of the present application. As shown in FIG. 12, the network device 30 includes:

a processor 31, a memory 32, a transmitter 34, an interface 35 for communicating with a terminal device, and in an implementation, the network device 30 further includes a receiver 33;

the memory 32 stores a computer executable instruction; and the processor 31 executes the computer executable instruction stored in the memory, so that the processor 31 executes the technical solutions on the sending end device side according to any one of the aforementioned method embodiments.

Figure 13:
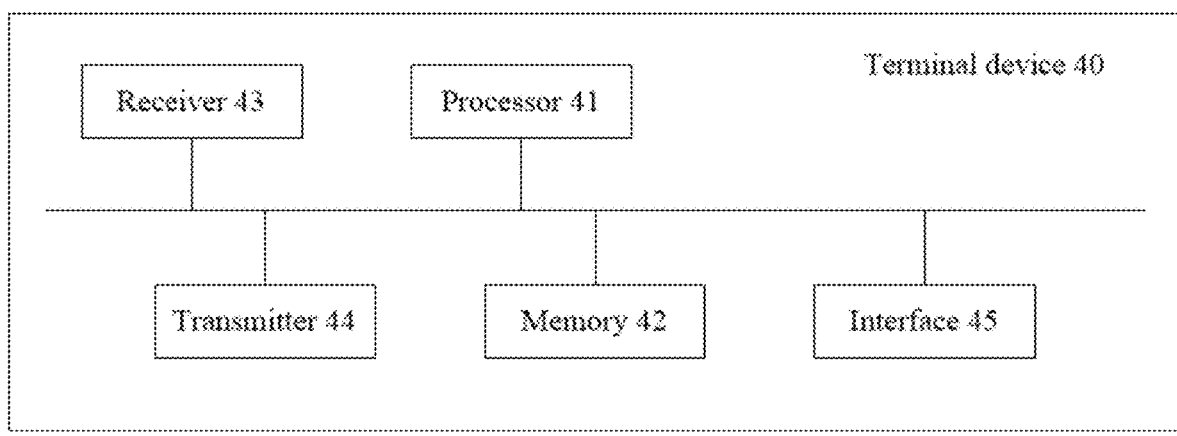
FIG. 13 is a structural schematic diagram of a first embodiment of a terminal device provided by an embodiment of the present application.

FIG. 13 is a structural schematic diagram of a first embodiment of a terminal device provided by an embodiment of the present application. As shown in FIG. 13, the terminal device 40 includes:

a processor 41, a memory 42, a receiver 43, an interface 45 for communicating with a network device; and in an implementation, the terminal device 40 further includes a transmitter 44;

the memory 42 stores a computer executable instruction; and the processor 41 executes the computer executable instruction stored in the memory, so that the processor 41 executes the technical solutions on the terminal device side according to any one of the aforementioned method embodiments.

The present application further provides a computer readable storage medium, the computer readable storage medium storing a computer executable instruction, and when executed by a processor, the computer executable instruction is used to implement the technical solutions on the network device side in any one of the aforementioned method embodiments.

The present application further provides a computer readable storage medium, the computer readable storage medium storing a computer executable instruction, and when executed by a processor, the computer executable instruction is used to implement the technical solutions on the terminal device side in any one of the aforementioned method embodiments.

An embodiment of the present application further provides a program, and when executed by a processor, the program is used to execute the technical solutions on the network device side in the aforementioned method embodiments.

An embodiment of the present application further provides a program, and when executed by a processor, the program is used to execute the technical solutions on the terminal device side in the aforementioned method embodiments.

An embodiment of the present application further provides a computer program product, including a program instruction, and the program instruction is used to implement the technical solutions on the network device side in the aforementioned method embodiments.

An embodiment of the present application further provides a computer program product, including a program instruction, and the program instruction is used to implement the technical solutions on the terminal device side in the aforementioned method embodiments.

An embodiment of the present application further provides a chip, including a processing module and a communication interface, and the processing module may execute the technical solutions on the network device side in the aforementioned method embodiments.

Further, the chip further includes a storing module (e.g., a memory), the storing module storing an instruction, and the processing module being used to execute the instruction stored in the storing module, and execution of the instruction stored in the storing module enables the processing module to execute the technical solutions on the network device side.

An embodiment of the present application further provides a chip, including a processing module and a communication interface, and the processing module may execute the technical solutions on the terminal device side in the aforementioned method embodiments.

Further, the chip further includes a storing module (e.g., a memory), the storing module storing an instruction, and the processing module being used to execute the instruction stored in the storing module, and execution of the instruction stored in the storing module enables the processing module to execute the technical solutions on the terminal device side.

In several embodiments provided in the present application, it should be understood that the disclosed system, apparatus, and method may be realized in other ways.

For example, apparatus embodiments described above are only schematic. For example, module division is only a logical function division. In an actual implementation, there may be another division mode, for example, a plurality of units or modules may be combined or integrated into another system, or some features may be ignored or not executed. On the other hand, mutual coupling or direct coupling or communication connection shown or discussed may be indirect coupling or communication connection through some interfaces, apparatuses, or units, and may be in electrical, mechanical or other forms.

In a specific implementation of the above network device and terminal device, it should be understood that a processor may be a central processing unit (for short: CPU), other general-purpose processors, a digital signal processor (for short: DSP), an application specific integrated circuit (for short: ASIC), etc. The general-purpose processor may be a microprocessor or the processor may be any conventional processor, etc. Steps of the method disclosed in the present application may be directly embodied as completion of being executed by a hardware processor, or by a combination of hardware and software modules in a processor.

All or part of steps for implementing the method embodiments described above may be completed by hardware related to a program instruction. The aforementioned program may be stored in a readable memory. When the program is executed, steps including the above method embodiments are executed; and the aforementioned memory (storage medium) includes: a read-only memory (for short: ROM), RAM, a flash memory a hard disk, a solid state disk, a magnetic tape, a floppy disk, an optical disc, and any combination thereof.

What is claimed is:

1. A data transmission method applied to a terminal device, the method comprising:
    obtaining first information indicated by a network device;
    determining a transmission configuration indicator (TCI) state corresponding to each demodulation reference signal (DMRS) port of a physical downlink control channel (PDSCH) according to the first information; and
    detecting the PDSCH according to the TCI state corresponding to each DMRS port of the PDSCH;
    wherein the first information comprises a high layer parameter for indicating to perform simultaneous repetition transmission of the PDSCH and DMRS port indication information;
    wherein the method further comprising:
    obtaining TCI information from a DCI scheduling the PDSCH, the TCI information indicating a plurality of TCI states;
    wherein the determining the TCI state corresponding to each DMRS port of the PDSCH according to the first information, comprises:
    in a condition that the high layer parameter indicates to perform the simultaneous repetition transmission of the PDSCH, determining that each DMRS port of the PDSCH corresponds to the plurality of TCI states.

2. The method according to claim 1, wherein the determining the TCI state corresponding to each DMRS port of the PDSCH according to the first information, further comprises:
    in a condition that the high layer parameter indicates to not perform the simultaneous repetition transmission of the PDSCH, determining that each DMRS port of the PDSCH corresponds to one of the plurality of TCI states.

3. The method according to claim 1, wherein the first information comprises the DMRS port indication information, then the determining the TCI state corresponding to each DMRS port of the PDSCH according to the first information, comprises:
    determining DMRS ports of the PDSCH and whether each DMRS port corresponds to the plurality of TCI states according to the DMRS port indication information;
    or,
    determining whether a DMRS port indicated by the DMRS port indication information corresponds to the plurality of TCI states according to a DMRS port index value indicated by the DMRS port indication information.

4. The method according to claim 1, wherein the determining the TCI state corresponding to each DMRS port of the PDSCH according to the first information, comprises:
    determining whether to perform the simultaneous repetition transmission of the PDSCH according to the first information; and
    determining the TCI state corresponding to each DMRS port of the PDSCH according to whether the simultaneous repetition transmission of the PDSCH is performed.

5. The method according to claim 4, wherein the determining the TCI state corresponding to each DMRS port of the PDSCH according to whether the simultaneous repetition transmission of the PDSCH is performed, comprises:
    in a condition that the simultaneous repetition transmission of the PDSCH is performed, determining that each DMRS port of the PDSCH corresponds to the plurality of TCI states, otherwise, each DMRS port of the PDSCH corresponds to one of the plurality of TCI states.

6. The method according to claim 4, wherein,
    the determining whether to perform the simultaneous repetition transmission of the PDSCH according to the first information, comprises:
    in a condition that the high layer parameter indicates to perform the simultaneous repetition transmission of the PDSCH, determining that the simultaneous repetition transmission of the PDSCH is performed; and
    in a condition that the high layer parameter indicates to not perform the simultaneous repetition transmission of the PDSCH, determining that the simultaneous repetition transmission of the PDSCH is not performed;
    or,
    determining the DMRS ports of the PDSCH and whether the simultaneous repetition transmission of the PDSCH is performed according to the DMRS port indication information, or determining whether the simultaneous repetition transmission of the PDSCH is performed according to a DMRS port index value indicated by the DMRS port indication information.

7. The method according to claim 1, wherein the detecting the PDSCH according to the TCI state corresponding to each DMRS port of the PDSCH, comprises:
    in a condition that each DMRS port of the PDSCH corresponds to a plurality of TCI states, using the plurality of TCI states to perform channel estimation on the DMRS ports and/or reception of the PDSCH respectively;
    or,
    determining one TCI state from the plurality of TCI states for performing channel estimation and/or reception of the PDSCH on the DMRS ports.

8. A terminal device, comprising:
a processor, a memory, a receiver, and an interface for communicating with a network device;
the memory stores a computer executable instruction; and
the processor executes the computer executable instruction stored in the memory to enable the processor to:
obtain first information indicated by the network device;
determine a transmission configuration indicator (TCI) state corresponding to each demodulation reference signal (DMRS) port of a physical downlink control channel (PDSCH) according to the first information; and
detect the PDSCH according to the TCI state corresponding to each DMRS port of the PDSCH;
wherein the first information comprises a high layer parameter for indicating to perform simultaneous repetition transmission of the PDSCH and DMRS port indication information;
wherein the processor is further enabled to obtain TCI information from a DCI scheduling the PDSCH, the TCI information indicating a plurality of TCI states;
wherein the processor is further enabled to:
in a condition that the high layer parameter indicates to perform the simultaneous repetition transmission of the PDSCH, determine that each DMRS port of the PDSCH corresponds to the plurality of TCI states.

9. The terminal device according to claim 8, wherein the processor is further enabled to:
in a condition that the high layer parameter indicates to not perform the simultaneous repetition transmission of the PDSCH, determine that each DMRS port of the PDSCH corresponds to one of the plurality of TCI states.

10. The terminal device according to claim 8, wherein the first information comprises the DMRS port indication information, then the processor is further enabled to:
determine DMRS ports of the PDSCH and whether each DMRS port corresponds to the plurality of TCI states according to the DMRS port indication information;
or,
determine whether a DMRS port indicated by the DMRS port indication information corresponds to the plurality of TCI states according to a DMRS port index value indicated by the DMRS port indication information.

11. The terminal device according to claim 8, wherein the processor is further enabled to:
determine whether to perform the simultaneous repetition transmission of the PDSCH according to the first information; and
determine the TCI state corresponding to each DMRS port of the PDSCH according to whether the simultaneous repetition transmission of the PDSCH is performed.

12. The terminal device according to claim 11, wherein the processor is further enabled to:
in a condition that the simultaneous repetition transmission of the PDSCH is performed, determine that each DMRS port of the PDSCH corresponds to the plurality of TCI states, otherwise, each DMRS port of the PDSCH corresponds to one of the plurality of TCI states.

13. The terminal device according to claim 11, wherein, the processor is further enabled to:
in a condition that the high layer parameter indicates to perform the simultaneous repetition transmission of the PDSCH, determine that the simultaneous repetition transmission of the PDSCH is performed; and
in a condition that the high layer parameter indicates to not perform the simultaneous repetition transmission of the PDSCH, determine that the simultaneous repetition transmission of the PDSCH is not performed;
or,
determine the DMRS ports of the PDSCH and whether the simultaneous repetition transmission of the PDSCH is performed according to the DMRS port indication information, or determine whether the simultaneous repetition transmission of the PDSCH is performed according to a DMRS port index value indicated by the DMRS port indication information.

14. The terminal device according to claim 8, wherein the processor is further enabled to:
in a condition that each DMRS port of the PDSCH corresponds to a plurality of TCI states, use the plurality of TCI states to perform channel estimation on the DMRS ports and/or reception of the PDSCH respectively;
or,
determine one TCI state from the plurality of TCI states for performing channel estimation and/or reception of the PDSCH on the DMRS ports.

* * * * *